United States Patent
Yedidia et al.

(10) Patent No.: US 6,910,000 B1
(45) Date of Patent: *Jun. 21, 2005

(54) GENERALIZED BELIEF PROPAGATION FOR PROBABILISTIC SYSTEMS

(75) Inventors: Jonathan S. Yedidia, Cambridge, MA (US); William T. Freeman, Acton, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 712 days.

This patent is subject to a terminal disclaimer.

(21) Appl. No.: 09/586,282

(22) Filed: Jun. 2, 2000

(51) Int. Cl.$^7$ .............................................. G06F 17/10
(52) U.S. Cl. ...................................................... 703/2
(58) Field of Search ............................. 703/2; 706/52, 706/45; 345/419; 708/801; 704/256; 382/203

(56) References Cited

U.S. PATENT DOCUMENTS

| | | | | |
|---|---|---|---|---|
| 5,412,756 A | * | 5/1995 | Bauman et al. ............... | 706/45 |
| 5,812,975 A | * | 9/1998 | Komori et al. ............. | 704/256 |
| 5,839,105 A | * | 11/1998 | Ostendorf et al. .......... | 704/256 |
| 6,282,559 B1 | * | 8/2001 | Helfenstein et al. ........ | 708/801 |
| 6,496,184 B1 | * | 12/2002 | Freeman et al. ............ | 345/419 |
| 6,529,891 B1 | * | 3/2003 | Heckerman .................. | 706/52 |
| 6,535,865 B1 | * | 3/2003 | Skaaning et al. ............ | 706/52 |
| 6,601,055 B1 | * | 7/2003 | Roberts ....................... | 706/45 |
| 6,671,405 B1 | * | 12/2003 | Savakis et al. ............. | 382/203 |

OTHER PUBLICATIONS

Freeman et al., "Learning low–level vision", IEEE, Sep. 1999.*
Kosaka et al., "Tree–structured speaker clustering for fast speaker adatation", IEEE 1994.*
Fung et al., "An architecture for probabilistic concept based information retrieval", ACM 1990.*
Bertsekas et al., "Data Networks", Prentice Hall, 1992—pp. 180–186.*

* cited by examiner

*Primary Examiner*—Kevin J. Teska
*Assistant Examiner*—Kandasamy Thangavelu
(74) *Attorney, Agent, or Firm*—Dirk Brinkman; Andrew J. Curtin

(57) ABSTRACT

A method determines approximate probabilities of states of a system represented by a model. The model includes nodes connected by links. Each node represents possible states of a corresponding part of the system, and each link represents statistical dependencies between possible states of related nodes. The nodes are grouped into arbitrary sized clusters such that every node is included in at least one cluster and each link is completely contained in at least one cluster. Messages, based on the arbitrary sized cluster, are defined. Each message has associated sets of source nodes and destination nodes, and a value and a rule depending on other messages and on selected links connecting the source nodes and destination nodes. The value of each message is updated until a termination condition is reached. When the termination condition is reached, approximate probabilities of the states of the system are determined from the values of the messages.

14 Claims, 17 Drawing Sheets

GENERALIZED BELIEF PROPAGATION FOR PROBABILISTIC SYSTEMS

FIELD OF THE INVENTION

This invention relates generally to modeling probabilistic systems, and more particularly, to modeling probabilistic systems using belief propagation in a Markov network.

BACKGROUND OF THE INVENTION

Computer models are frequently used to study the behavior of complex probabilistic systems. When the systems contain many inter-dependent random variables, Markov networks are often used. In a Markov network, nodes of the network represent the possible states of a part of the system, and links between the nodes represent statistical dependencies between the possible states of those nodes.

By the Hammersly-Clifford theorem, from the study of Markov networks, the probability of any set of states at the nodes of the network can be written as the product of compatibility functions between clusters of nodes.

FIG. 1 shows a simple network with four nodes labeled a, b, c, and d. The links between the nodes represent the statistical dependencies between the possible states of the nodes. For the case of pairwise probabilistic interactions between nodes of the network, the overall joint probability of the system can be expressed as the product of compatibility functions for each linked pair of nodes:

$$P(s_a, s_b, s_c, s_d) = \phi_{ab}(s_a, s_b)\phi_{bc}(s_b, s_c)\phi_{ca}(s_c, s_a)\phi_{bd}(s_b, s_d), \quad [1]$$

where $\phi_{ab}$ is the compatibility matrix between nodes a and b, $s_a$ is a random variable describing the state at node a, and similarly for the other nodes and variables.

Often, Markov networks for practical applications are very large. For example, an image acquired from a scene by a camera may be represented by a Markov network between all small neighboring patches, or even pixels, of the acquired image. Similarly, the well known "travelling salesman problem" can map onto a Markov network where the maximum probability state corresponds to the shortest path of the salesman's route. This network has as many nodes as cities to be visited. In some Markov networks, the nodes can represent measured input signals, such as visual input data. Markov models are also extensively used in speech recognition systems.

To analyze the probabilistic system modeled by a Markov network, one typically wants to find the marginal probabilities of certain network variables of interest. (The "marginal probability" of a variable signifies the probability of that variable ignoring, the state of any other network variable.) For example, it may be useful to examine the probability of a variable that represents an underlying explanation for some measured data, such as the probability of particular words used to vocalize particular speech sounds. To find those probabilities, the Markov network is marginalized over all the other variables in the network. This gives the probability of the variable representing the explanation, given the measured input data values. This marginalization is thus a form of inference.

One may also want to find states of the nodes, which maximize the network probabilities. For example, for the Markov network corresponding to the travelling salesman problem, it is desired to find the state at each node which maximize the probability of the Markov network. These states, which minimize the length of the salesman's route, are known as the maximum a posteriori probability (MAP) states.

In the example of FIG. 1, it is possible to determine the marginal probability $P(s_a)$ of the variable at node a by summing the random values at nodes b, c, and d:

$$P(s_a) = \sum_{s_b, s_c, s_d} \phi_{cb}(s_a, s_b)\phi_{bc}(s_b, s_c)\phi_{ca}(s_c, s_a)\phi_{bd}(s_b, s_d). \quad [2]$$

In general, especially for large networks, these marginal probabilities are infeasible to determine directly. The joint sum over all possible states of all the nodes can be of too high a dimension to sum numerically, particularly when the network has closed loops.

FIGS. 2a–b show examples of Markov networks with many loops for which it is difficult to find either the marginal probability at a node, or the state of the node which maximizes the overall probability of the Markov network. Both networks are in the form of lattices, which are commonly used to describe the joint probabilities of variables spatially, distributed over two dimensions. FIG. 2a shows a rectangular lattice, and FIG. 2b shows a triangular lattice. These type of lattice networks are used to model many systems.

Techniques to approximate the marginal probabilities for such structures are known, but these techniques are typically very slow. Simulated annealing can be used, or Gibbs sampling, see Geman et al. "Stochastic relaxation, Gibbs distribution, and the Bayesian restoration of images," IEEE Pattern Analysis and Machine Intelligence, 6:721–741, 1984. Another class of approximation techniques are variational methods, see Jordan, "Learning in graphical models," MIT Press, 1998. However, these methods require an appropriate class of variational approximation functions for a particular problem. It is not obvious which functions, out of all possible ones, to use for the approximations.

For the special case of Markov networks that form chains or trees, there is a local message-passing method that calculates the marginal probabilities at each node, see Pearl, "Probabilistic reasoning in intelligent systems: networks of plausible inference," Morgan Kaufmann, 1988. The later method is now in widespread use, and is equivalent to the "forward-backward" and Viterbi methods for solving one dimensional Hidden Markov Models (HMM), and to Kalman filters and their generalization to trees, see Luettgen et al. in "Efficient multiscale regularization with applications to the computation of optical flow," IEEE Trans. Image Processing, 3(1):41–64, 1994. This message-passing method gives the exact marginal probabilities for any Markov network that does not have loops. This is referred to as the "standard" belief propagation, or message-passing method below.

Unfortunately, many Markov networks of practical interest do contain loops. For example, an image, modeled as a Markov network of local image patches connected to their nearest neighbors, gives a lattice structured Markov network as shown in FIGS. 2a–b, also called a Markov random field. This type of network contains many loops.

Another method for inference in Markov networks applies the local message-passing rules derived for trees and chains in a network, even though the network may contain loops, see Weiss, "Belief propagation and revision in networks with loops," Technical Report 1616, MIT AI Lab, 1997. This is referred to as the "loopy" belief propagation method in the description below, although it should be clearly understood that the "loopy" method is nothing more than the "standard" belief propagation method applied to a network with loops. When such a procedure converges, it can yield an approximate determination of the marginal probabilities. However, the loopy method sometimes gives too poor an approximation to the marginal probabilities, and often does not even converge. In the latter case, the approximation gives no single answer for the desired marginal probabilities.

Therefore, it is desired to provide a method for determining marginal probabilities in Markov networks that is both relatively fast and more accurate than the loopy method. Furthermore, it is desired to provide a method for networks with loops that converges more reliably than the prior art loopy belief propagation method.

SUMMARY OF THE INVENTION

The present invention provides a method for determining the probabilities of nodes in a network model of a complex probabilistic system. More particularly, the method determines desired marginal or maximum a posteriori probabilities in networks with loops. The method uses a message-passing scheme, appropriate for networks with loops, which is more accurate and typically converges more reliably and in fewer iterations than prior art loopy belief propagation methods.

The invention describes a class of procedures in which computational cost and accuracy can be traded off against each other, allowing a user of the invention to select more computation for more accuracy in a particular application of the invention.

The invention has two major advantages over the prior art loopy belief propagation method. First, the invented method normally gives much more accurate answers for the desired marginal probabilities. Second, the invented method can converge to a single answer in cases where the loopy method does not.

Instead of finding the marginal probability at a node, one embodiment of the invention finds the states at each node which approximately maximize the probability of the entire network. Thus, the invention provides a novel way to approximate both the marginal probabilities and MAP states in Markov networks.

Many Markov network problems of interest are known to be NP-hard problems. A problem is NP-hard when it is intrinsically harder than those problems that can be solved by a Turing machine in nondeterministic polynomial time. When a decision version of a combinatorial optimization problem belongs to the class of NP-complete problems, which includes the traveling salesman problem described above, an optimization version is NP-hard. The invented method yields fast, approximate solutions for some of these very difficult optimization problems.

More particularly, the invention provides a method for determining marginal probabilities of states of a system represented by a model. The model includes nodes connected by links. Each node represents possible states of a corresponding part of the system, and each link represents statistical dependencies between possible states of related nodes.

The nodes are grouped into arbitrary sized clusters such that every node is included in at least one cluster and each link is completely contained in at least one cluster. Based on the arbitrary sized cluster, messages are defined. Each message has associated sets of source nodes and destination nodes, a value for each state of the destination nodes and a rule that depends on other messages and on selected links connecting the source nodes and destination nodes. The values of each message are updated using the associated rule until a termination condition is reached, at which point the probabilities of the states of the system are determined from the values of the messages.

DETAILED DESCRIPTION OF THE PREFERRED EMBODIMENTS

Introduction

Our invention builds on the "cluster variational method" for analyzing cooperative phenomena in statistical physics, see for example, the special issue in honor of R. Kikuchi, Progress in Theoretical Physics Supplements, vol. 115, 1994.

A physical system is often modeled in statistical mechanics as a Markov network, where the states of the nodes in the network correspond to the physical states of the particles or spins in the physical system. The cluster variational method derives approximations to the "Gibbs free energy" of a physical system. We refer to these as "Kikuchi approximations" to the Gibbs free energy, or the "Kikuchi free energy." From a Kikuchi approximation to the Gibbs free energy, one can determine properties of a physical system, such as magnetization, specific heat, or the critical temperature for a magnetic spin system.

The simplest Kikuchi approximation derived with the cluster variational method corresponds to an approximation first proposed by Bethe, see Bethe, Proc. Roy. Soc. (London) A 150 (1935) 552. The loopy belief propagation method, when it converges, gives marginal probabilities identical to those obtained from the Bethe approximation.

Solutions obtained from propagation rules according to our invention are equivalent to solving the appropriate physical system under the corresponding Kikuchi approximation. The method of minimizing the Kikuchi free energy directly will therefore give identical results to our method, but such a direct minimization will be extremely slow and be plagued by the problem of convergence to inappropriate local minimal in the free energy surface. Thus, physics calculations made with more complicated Kikuchi approximations have typically only been tractable for homogeneous models of physical systems. As an advantage, our belief propagation method is also practical for heterogeneous models of physical systems where the nodes of the model have arbitrary topology and interdependencies.

Calculation of Marginal Probabilities by Kikuchi Free Energy Minimization

Figure 3:
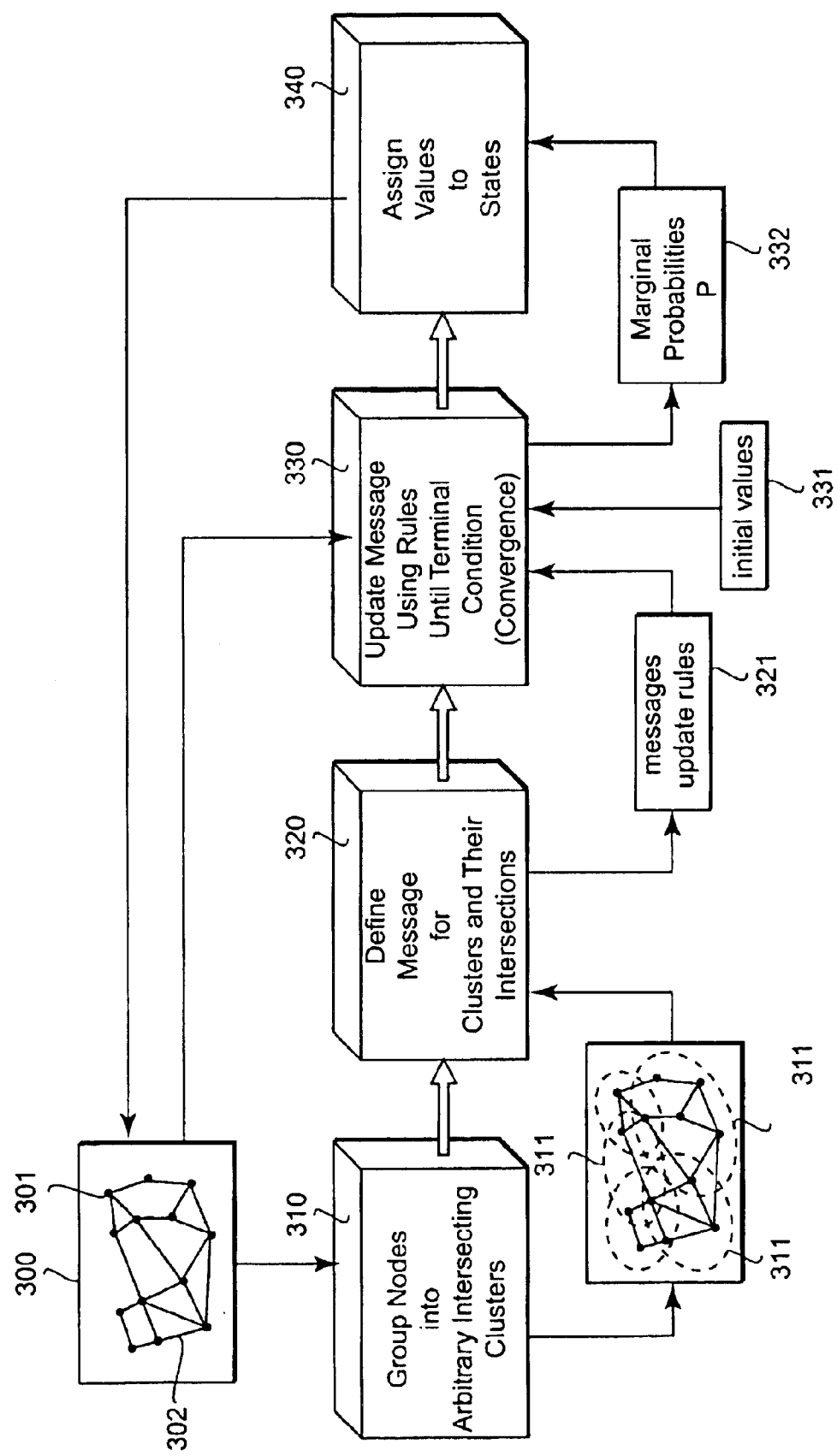
FIG. 3 is a flow diagram of a method for propagating beliefs in a network according to a preferred embodiment of the invention.

As shown in FIG. 3, we begin with a network 300 representing a system or model. Typically, the network is constructed ahead of time by an "expert" in the art field in which the model operates. It is not our job to construct the model; instead, we provide a method for using the model, even if the model is heterogeneous and includes many loops. For example, in a medical diagnosis system, the nodes can represent clinical findings, physiological and psychological conditions, laboratory results, pathologies, etc. Here, the goal may be to use the model to make the best (most probable) diagnosis given observations made for a particular patient. In an error-correcting coding system, the nodes represent source bits or parity bits, and the links represent the required relationships between the bits. Here, the goal may be to use the model to decode a block of bits that has been corrupted by noise.

The model includes a plurality of nodes 301. A random variable s at each node takes on one of a discrete set of states, or it may take on a continuum of states. The nodes are connected to others by links 302 to form the network model 300. Typically, a link connects two nodes, however higher-order links can connect more than two nodes. The network model 300 can represent a magnetic spin system, a medical diagnosis system, an image-processing system, a speech recognition system, a genetic regulatory network, a decoding system, or other complex real-world systems.

By definition, for a Markov network with pair-wise statistical dependencies between nodes, the probability of a particular assignment of values s at the nodes is given by:

$$P(s_1, s_2, \ldots s_N) = \frac{1}{Z} \prod_{i,j} \phi_{ij}(s_i, s_j) \prod_i \psi(s_i), \qquad [3]$$

where the first product runs over all the linked neighboring nodes, i and j.

The $\phi$ compatibility matrices represent the statistical dependencies between the nodes, as represented by the links 302 in the network model 300. For example, in a medical diagnosis system, one node might represent a symptom, and the nodes that it is linked to are related symptoms or diseases. The numerical values of the compatibility matrices $\phi$, represent the strength of the relation between specific nodes. For example, in a medical diagnosis model, some symptoms might be strongly correlated with certain diseases, i.e. a strong statistical dependency, while other symptoms might only have weak statistical correlation with other symptoms or diseases.

For some systems, it may be desired to represent the statistical dependencies between the states of the nodes by compatibility functions ("links") that are higher-order tensors. For example, if the states of nodes i, j, and k are mutually statistically dependent, but those dependencies cannot be expressed in terms of pair-wise interactions, then we introduce the tensor $\phi_{ijk}(s_i,s_j,s_k)$ to represent those dependencies. The over-all probability of the system would then also include the product over all higher-order tensors as well. The method we describe here will also apply to systems with such higher-order links between nodes. All that is necessary is to include terms that arise from the higher-order links in the "energy" and "region energies" that we describe below.

The $\psi$ functions represent the "evidence" that each node is in any particular one of its states before we consider any of the other nodes. While the $\phi$ functions will normally never change, the $\psi$ functions will typically change from one use of the model to another. For example, in the case of a medical diagnosis model, the $\psi_i(s_i)$ function represents, for a specific patient, the results of a given test. To use the same model for a different patient, we use different evidence, represented through the $\psi$ functions, but we do not change the $\phi$ functions, which represent the relationships between different symptoms, diseases, tests, etc.

In equation [3], Z is a normalization constant that insures that the sum of the probabilities of all possible states of the overall system is equal to one.

In order to describe the "Kikuchi free energy" of the model, it is helpful to define some additional functions, which are motivated by common conventions from statistical physics. We define the "bond strength" $J_{ij}(s_i,s_j)$ between two nodes i and j by:

$$\phi_{ij}(s_i,s_j) = e^{J_{ij}(s_i,s_j)/T} \qquad [4]$$

where T is a parameter called the "temperature." We define the "field" $h_i(s_i)$ at the node i by:

$$\psi_i(s_i) = e^{-h_i(s_i)/T} \qquad [5]$$

In terms of these variables, we have:

$$P(s_1, s_2, \ldots, s_N) = \frac{1}{Z} e^{-E(s_1,s_2,\ldots,s_N)/T}, \qquad [6]$$

where E is the "energy":

$$E(s_1, s_2, \ldots, s_N) = \sum_{ij} J_{ij}(s_i, s_j) + \sum_i h_i(s_i). \qquad [7]$$

In statistical physics, equation [6], which is equivalent to the original definition [3] of the Markov model, is known as "Boltzmann's Law," and the normalization constant Z is called the "partition function." The partition function is defined explicitly by $$Z = \sum_{s_1,s_2,\ldots,s_N} e^{-E(s_1,s_2,\ldots,s_N)/T}. \qquad [8]$$

Following the conventions of statistical physics, we define a quantity called the "Gibbs free energy." The Gibbs free energy G is a function of the probability distribution $P(s_1,s_2,\ldots,s_N)$. By design, G is defined so that if it is minimized as a function P, then Boltzmann's Law is automatically obeyed. G is defined by:

$$G(P(s_1, s_2, \ldots, s_N), \gamma) = U - TS + \quad [9]$$

$$\gamma \left[ 1 - \sum_{s_1, s_2, \ldots, s_N} P(s_1, s_2, \ldots, s_N) \right].$$

Here, U is the expected value of the energy, also called the "internal energy":

$$U = \sum_{s_1, s_2, \ldots, s_N} E(s_1, s_2, \ldots, s_N) P(s_1, s_2, \ldots, s_N) \quad [10]$$

and S is the entropy:

$$S = -\sum_{s_1, s_2, \ldots, s_N} P(s_1, s_2, \ldots, s_N) \ln(P(s_1, s_2, \ldots, s_N)). \quad [11]$$

The last term in equation [9] is a Lagrange multiplier term designed to enforce the constraint that the sum of the probabilities over all states is equal to one. In order to insure that this constraint is satisfied, we set the partial derivative of G with respect to the Lagrange multiplier γ equal to zero.

If we differentiate the Gibbs free energy G with respect to the probability distribution P and the Lagrange multiplier y, and set those partial derivatives equal to zero, then we recover Boltzmann's Law. Thus, to understand physical systems, physicists often try to calculate and differentiate the Gibbs free energy.

For a large system, it is intractable to calculate G exactly, so Bethe, Kikuchi, and many others have developed approximation schemes. In these schemes, one determines exactly the Gibbs free energy over some small clusters of nodes of the network, and then approximates the total Gibbs free energy as a sum over many small clusters of nodes, correcting for over-counting in regions where the different clusters overlap. In the Bethe approximation, the clusters are precisely those pairs of nodes that are linked in the Markov network, while Kikuchi's more accurate approximations, also called the "cluster variational method," allow for clusters of a larger size.

The cluster variational method errs by missing contributions to the Gibbs free energy that arise from high-order correlations between nodes that cannot be described in terms of the chosen clusters or intersections of clusters. The larger the size of the small clusters, the smaller the error.

In principle, the cluster variational method allows for arbitrary clusters on arbitrary Markov networks. In practice, however, most previous computations involving minimization of a Kikuchi free energy were restricted to symmetrically placed clusters over a homogenous network. Computations on inhomogeneous networks have been performed, but only for the Bethe approximation, see Morita, Physica 98A (1979) 566.

By "homogenous" networks, we mean networks for which the nodes are arranged in some regular repeated pattern, and the interactions between the nodes depends only on their position in that pattern. Many magnetic spin systems are "homogenous" in this sense, but most of the other types of systems that are modeled with Markov networks, such as the example of a medical diagnosis system, are not homogenous.

Previous prior art Kikuchi free energy minimization calculations were restricted to symmetrically placed clusters over a homogeneous network because, before our invention, there was no practical way to quickly minimize a Kikuchi free energy defined for arbitrary clusters over an inhomogeneous Markov network of arbitrary topology.

Using the Kikuchi approximate form for the total Gibbs free energy, we can approximately calculate the marginal probabilities of the variables at the nodes, and also the marginal probabilities of collections of nodes. We extend this technique to develop a message-passing method that converges to solutions corresponding to a Kikuchi approximation of the Gibbs free energy. A message-passage method, as an advantage over the prior art Kikuchi free energy calculations, is very much faster and more practical for inhomogeneous networks.

Kikuchi Free Energy Calculation for Simple Example

Figure 4C:
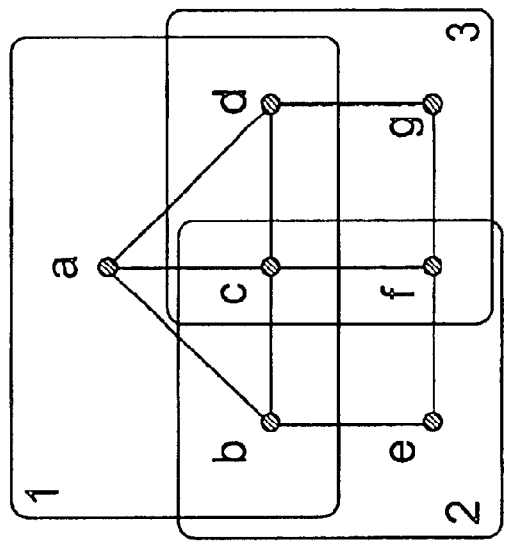
FIGS. 4a–c are graphs of nodes grouped into arbitrary sized intersecting clusters.
Figure 4B:
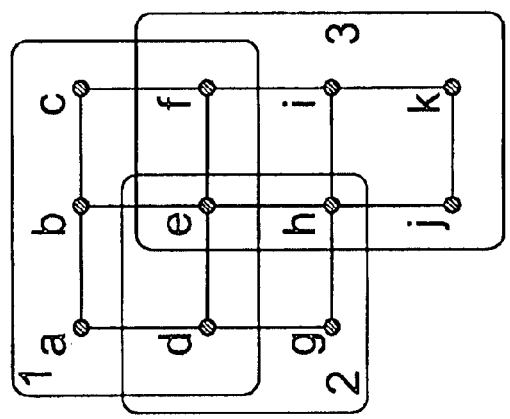
Figure 4A:
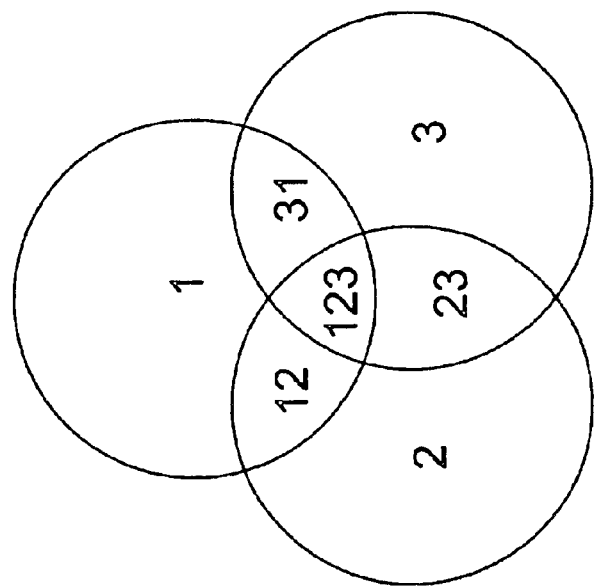

We use FIGS. 4a–c to illustrate our generalized message-based belief propagation method. This example network shows how we develop a message-passing method that has a corresponding Kikuchi approximation result as a fixed point of the messages. That is to say, our message-passing method will converge to a solution that is equivalent to the solution of the Kikuchi approximation.

FIG. 4a is a graph of many nodes grouped into three clusters. The clusters intersect each other. The nodes and their links are not shown, and indeed, the number of nodes per cluster can be quite large. In real world physical systems, one usually chooses many more than three clusters for a Kikuchi approximation. FIGS. 4b–c depict two possible instantiations of the three clusters and their intersections.

As described above with respect to FIG. 3, we group 310 the nodes of the network 300 into arbitrary intersecting clusters 311. A cluster is said to be intersecting if a single node appears in more than one cluster. Because we do an arbitrary clustering, we can focus on regions of the model that might be more significant to an exact solution. We require that every node is included in at least cluster. We also require that every link in the Markov network is completely included in at least one cluster. The first constraint ensures that our clusters represent and consider all nodes of the model, and the second constraint ensures that the clusters will intersect.

FIG. 4a shows abstractly three clusters of nodes (regions 1, 2, and 3), and their intersections (regions 12, 31, and 23), and intersections of intersections (region 123).

We use the following terminology. The largest regions are referred to as "clusters." The clusters, along with their intersections, and the intersections of those intersections, and so on, are referred to collectively as "regions." A "sub-region" of region r is a region that consists of a proper subset of the nodes in region r. Region r is a "super-region" of region s if and only if region s is a sub-region of region r.

The number of nodes in each cluster can vary, and be different from each other. As stated before larger clusters will yield better results than small clusters albeit at a greater computational cost. Note that region 12 is interpreted to include region 123, just as region 1 also includes region 123.

In equation [12] below, we approximate the total Gibbs free energy for the system 300 by the sum of the free energies of each of the clusters. Then, we include correction terms by subtracting the free energy of intersection regions where we over-counted the free energy. We may include additional correction terms for the over-counted intersections of the intersection regions, etc. In addition, we impose, with Lagrange multipliers, the additional constraints that the probabilities of each region sum to one, and that the probabilities have the correct marginalization relationships with respect to each other.

We express the Gibbs free energy in terms of the probabilities of each of the regions. We let $\alpha_i$ be a particular assignment of node values within the cluster region i. This is what we called $s_1, s_2, \ldots, s_N$ in equation [3] above. Our notation for region intersections is to concatenate the indices of the intersecting regions, so $\alpha_{ijk}$ is a particular assignment of node values within the region of intersection of regions i, j, and k.

The "region energy" $E(\alpha_i)$ includes those terms in the overall energy that can be attributed to nodes or links contained entirely in the region i, when the nodes in the region are set to the particular values denoted by $\alpha_i$. Note that if there are higher-order tensor "links" in the definition of the system, the region energy will still contain those links that are contained.

The "region probability" $P(\alpha_i)$ is the marginal probability that the nodes in cluster i take on the particular values denoted by $\alpha_i$. In our notation, the normalization constraint for region i is $\Sigma_{\alpha_i} P(\alpha_i) = 1$. That is, the sum over the probabilities of all possible value assignments to the nodes of region i is one. An analogous equation holds for all regions. These are the Lagrange multiplier constraints $\gamma$ in equation [12], below.

The second set of constraints for the Gibbs free energy in equation [12] are the marginalization constraints, associated with Lagrange multipliers $\lambda$. The Lagrange multipliers impose consistency constraints between the probabilities of the regions and their intersecting sub-regions. The probability of a region, marginalized over all the nodes in the region not in some intersection region, must equal the marginal probability of the nodes in that intersection region. In our notation, $\Sigma_{\alpha_{i\setminus j}} P(\alpha_i) = P(\alpha_{ij})$, where $\Sigma_{\alpha_{i\setminus j}}$ means the sum over all nodes in region i that are not in region j.

For the three clusters of nodes shown in FIGS. 4b–c, we express the Gibbs free energy in the Kikuchi approximation as $G_{1,2,3}$. We have three sets of U–ST terms, first a sum over states $\alpha_i$ for the cluster region free energies, second the terms involving $\alpha_{ij}$ where we subtract over-counted intersection regions, and a third term involving $\alpha_{123}$ where we correct for over-subtracting that intersection region. After all these corrections are made, each subset of each region is counted exactly once, as it should be.

$$G_{1,2,3} = (U - ST) \text{ terms} + \gamma \text{ constraints} + \lambda \text{ constraints} \quad [12]$$

$$= \sum_{\alpha_1} P(\alpha_1) E(\alpha_1) + \sum_{\alpha_2} P(\alpha_2) E(\alpha_2) + \sum_{\alpha_3} P(\alpha_3) E(\alpha_3) +$$

$$T \sum_{\alpha_1} P(\alpha_1) \ln(P(\alpha_1)) + T \sum_{\alpha_2} P(\alpha_2) \ln(P(\alpha_2)) +$$

$$T \sum_{\alpha_3} P(\alpha_3) \ln(P(\alpha_3)) - \sum_{\alpha_{12}} P(\alpha_{12}) E(\alpha_{12}) -$$

$$\sum_{\alpha_{23}} P(\alpha_{23}) E(\alpha_{23}) - \sum_{\alpha_{31}} P(\alpha_{31}) E(\alpha_{31}) -$$

$$T \sum_{\alpha_{12}} P(\alpha_{12}) \ln(P(\alpha_{12})) - T \sum_{\alpha_{23}} P(\alpha_{23}) \ln(P(\alpha_{23})) -$$

$$T \sum_{\alpha_{31}} P(\alpha_{31}) \ln(P(\alpha_{31})) + T \sum_{\alpha_{123}} P(\alpha_{123}) E(\alpha_{123}) +$$

$$T \sum_{\alpha_{123}} P(\alpha_{123}) \ln(P(\alpha_{123})) + \gamma_1 \left[ 1 - \sum_{\alpha_1} P(\alpha_1) \right] +$$

$$\gamma_2 \left[ 1 - \sum_{\alpha_2} P(\alpha_2) \right] + \gamma_3 \left[ 1 - \sum_{\alpha_3} P(\alpha_3) \right] +$$

-continued $$\gamma_{12} \left[ 1 - \sum_{\alpha_{12}} P(\alpha_{12}) \right] + \gamma_{23} \left[ 1 - \sum_{\alpha_{23}} P(\alpha_{23}) \right] +$$

$$\gamma_{31} \left[ 1 - \sum_{\alpha_{31}} P(\alpha_{31}) \right] + \gamma_{123} \left[ 1 - \sum_{\alpha_{123}} P(\alpha_{123}) \right] +$$

$$\sum_{\alpha_{12}} \lambda_{1\setminus 12}(\alpha_{12}) \left[ P(\alpha_{12}) - \sum_{\alpha_{1\setminus 12}} P(\alpha_1) \right] +$$

$$\sum_{\alpha_{12}} \lambda_{2\setminus 12}(\alpha_{12}) \left[ P(\alpha_{12}) - \sum_{\alpha_{2\setminus 12}} P(\alpha_2) \right] +$$

$$\sum_{\alpha_{23}} \lambda_{2\setminus 23}(\alpha_{23}) \left[ P(\alpha_{23}) - \sum_{\alpha_{2\setminus 23}} P(\alpha_2) \right] +$$

$$\sum_{\alpha_{23}} \lambda_{3\setminus 23}(\alpha_{23}) \left[ P(\alpha_{23}) - \sum_{\alpha_{3\setminus 23}} P(\alpha_3) \right] +$$

$$\sum_{\alpha_{31}} \lambda_{3\setminus 31}(\alpha_{31}) \left[ P(\alpha_{31}) - \sum_{\alpha_{3\setminus 31}} P(\alpha_3) \right] +$$

$$\sum_{\alpha_{31}} \lambda_{1\setminus 31}(\alpha_{31}) \left[ P(\alpha_{31}) - \sum_{\alpha_{1\setminus 31}} P(\alpha_1) \right] +$$

$$\sum_{\alpha_{123}} \lambda_{12\setminus 123}(\alpha_{123}) \left[ P(\alpha_{123}) - \sum_{\alpha_{12\setminus 123}} P(\alpha_{12}) \right] +$$

$$\sum_{\alpha_{123}} \lambda_{23\setminus 123}(\alpha_{123}) \left[ P(\alpha_{123}) - \sum_{\alpha_{23\setminus 123}} P(\alpha_{23}) \right] +$$

$$\sum_{\alpha_{123}} \lambda_{31\setminus 123}(\alpha_{123}) \left[ P(\alpha_{123}) - \sum_{\alpha_{31\setminus 123}} P(\alpha_{31}) \right].$$

One point about the marginalization constraints. One might wonder why we do not also have terms like $$\sum_{\alpha_{123}} \lambda_{1\setminus 123}(\alpha_{123}) \left[ P(\alpha_{123}) - \sum_{\alpha_{1\setminus 123}} P(\alpha_1) \right]$$

which enforce that region 1 properly marginalizes down to region 123. We omit these terms because they are redundant with the marginalization equations already included in $G_{1,2,3}$.

Marginalization is a linear operator. Of the three possible constraints relating regions i, ij, and ijk, that region i marginalize down to region ij, that ij marginalize down to ijk, and that region i marginalize down to ijk, we only need two, and the third is linearly dependent on the other two equations.

The Kikuchi approximation to the Gibbs free energy can be generalized to the case of an arbitrary collection of regions in a relatively straightforward way, but we need to establish some additional more notation. Let r denote a region chosen from the set of all relevant regions R. Let S(r) denote the set of sub-regions of r and T(r) denote the set of super-regions of r. Define a "direct sub-region" of r as a sub-region that does not have a super-region that is also a sub-region of r. Thus, in our three cluster example, regions 12 and 13 are direct sub-regions of region 1, but region 123 is not. Let $S_d(r)$ denote the set of direct sub-regions of r and $T_d(r)$ denote the set of direct super-regions of r. Associate with each region r a "over-counting number" $d_r$, defined recursively by $$d_r = 1 - \sum_{t \in T(r)} d_t. \qquad [13]$$

The largest regions with no super-regions are defined to have a double-counting number of one. In the three-cluster case, we have $d_1=d_2=d_3=1$, $d_{12}=d_{23}=d_{31}=-1$, and $d_{123}=1$. The over-counting number is needed to insure that each link is ultimately counted exactly once.

The generalization of equation [12] for the Kikuchi approximation to the Gibbs free energy for the case of an arbitrary collection of regions is:

$$G = \sum_{r \in R} \left[ d_r(U_r - TS_r) + \gamma_r \left[ 1 - \sum_{\alpha_r} P(\alpha_r) \right] + \sum_{s \in S_d(r)} \sum_{\alpha_s} \lambda_{r \backslash s}(\alpha_s) \left[ P(\alpha_s) - \sum_{\alpha_{r \backslash s}} P(\alpha_r) \right] \right], \qquad [14]$$

where $U_r$ and $S_r$ are the internal energy and entropy of the region r.

We want to find the cluster region probabilities that minimize the Kikuchi free energy while obeying the marginalization and normalization constraints. These probabilities are the correct marginal probabilities under the Kikuchi approximation.

To find equations for those probabilities, we differentiate equation [14] with respect to each of the region probabilities for each possible assignment of values to a region and set the result to zero. The resulting equations, illustrated for the three-cluster example of FIG. 4a, are:

$$E(\alpha_1) + T + T \ln P(\alpha_1) + \gamma_1 = \lambda_{1\backslash12}(\alpha_{12}) + \lambda_{1\backslash31}(\alpha_{31}) \qquad [15]$$

$$E(\alpha_2) + T + T \ln P(\alpha_2) + \gamma_2 = \lambda_{2\backslash12}(\alpha_{12}) + \lambda_{2\backslash23}(\alpha_{23}) \qquad [16]$$

$$E(\alpha_3) + T + T \ln P(\alpha_3) + \gamma_3 = \lambda_{3\backslash23}(\alpha_{23}) + \lambda_{2\backslash31}(\alpha_{31}) \qquad [17]$$

$$-E(\alpha_{12}) - T - T \ln P(\alpha_{12}) + \gamma_{12} = -\lambda_{1\backslash12}(\alpha_{12}) - \lambda_{2\backslash12}(\alpha_{12}) + \lambda_{12\backslash123}(\alpha_{123}) \qquad [18]$$

$$-E(\alpha_{23}) - T - T \ln P(\alpha_{23}) + \gamma_{23} = -\lambda_{2\backslash23}(\alpha_{23}) - \lambda_{3\backslash23}(\alpha_{23}) + \lambda_{23\backslash123}(\alpha_{123}) \qquad [19]$$

$$-E(\alpha_{31}) - T - T \ln P(\alpha_{31}) + \gamma_{31} = -\lambda_{1\backslash31}(\alpha_{31}) - \lambda_{3\backslash31}(\alpha_{31}) + \lambda_{31\backslash123}(\alpha_{123}) \qquad [20]$$

$$E(\alpha_{123}) + T + T \ln P(\alpha_{123}) + \gamma_{123} = -\lambda_{12\backslash123}(\alpha_{123}) - \lambda_{12\backslash123}(\alpha_{123}) - \lambda_{31\backslash123}(\alpha_{123}) \qquad [21]$$

Exponentiating both sides and rearranging terms of each equation, we have the following set of equations for the marginal posterior probabilities:

$$P(\alpha_1) = k_1 \exp\left(\frac{-E(\alpha_1)}{T}\right) \exp\left(\frac{\lambda_{1/12}(\alpha_{12}) + \lambda_{1\backslash31}(\alpha_{31})}{T}\right) \qquad [22]$$

$$P(\alpha_2) = k_2 \exp\left(\frac{-E(\alpha_2)}{T}\right) \exp\left(\frac{\lambda_{2/12}(\alpha_{12}) + \lambda_{2\backslash23}(\alpha_{23})}{T}\right) \qquad [23]$$

$$P(\alpha_3) = k_3 \exp\left(\frac{-E(\alpha_3)}{T}\right) \exp\left(\frac{\lambda_{3/23}(\alpha_{23}) + \lambda_{3\backslash31}(\alpha_{31})}{T}\right) \qquad [24]$$

$$P(\alpha_{12}) = k_{12} \exp\left(-\frac{E(\alpha_{12})}{T}\right) \exp\left(\frac{\lambda_{1/12}(\alpha_{12}) + \lambda_{2\backslash12}(\alpha_{12}) - \lambda_{12\backslash123}(\alpha_{123})}{T}\right) \qquad [25]$$

$$P(\alpha_{23}) = k_{23} \exp\left(-\frac{E(\alpha_{23})}{T}\right) \exp\left(\frac{\lambda_{2/23}(\alpha_{23}) + \lambda_{3\backslash23}(\alpha_{23}) - \lambda_{23\backslash123}(\alpha_{123})}{T}\right) \qquad [26]$$

$$P(\alpha_{31}) = k_{31} \exp\left(-\frac{E(\alpha_{31})}{T}\right) \exp\left(\frac{\lambda_{3/31}(\alpha_{31}) + \lambda_{1\backslash31}(\alpha_{31}) - \lambda_{31\backslash123}(\alpha_{123})}{T}\right) \qquad [27]$$

$$P(\alpha_{123}) = k_{123} \exp\left(-\frac{E(\alpha_{123})}{T}\right) \exp\left(\frac{-\lambda_{12/123}(\alpha_{123}) - \lambda_{23\backslash123}(\alpha_{123}) - \lambda_{31\backslash123}(\alpha_{123})}{T}\right), \qquad [28]$$

where the k's are normalization constants, different for each equation, that normalize each marginal probability. Each of these equations is actually a collection of equations. Thus, if we focus on equation [22], we get one equation for each instantiation of $\alpha_1$. On the right hand side of this equation, $\alpha_{12}$ and $\alpha_{31}$ are completely determined by $\alpha_1$, because regions 12 and 31 are sub-regions of region 1.

Of course, we also need to differentiate the Gibb's free energy with respect to the $\lambda$ and $\gamma$ Lagrange multipliers. Doing that gives us the desired marginalization and normalization conditions for the region probabilities.

From Lagrange Multipliers to Messages

In the previous section, we derived a set of self-consistent equations for region probabilities and Lagrange multipliers by differentiating the Kikuchi approximation of the Gibbs free energy. These equations are a solution to the problem of finding marginal posterior probabilities at the level of the Kikuchi approximation.

In our new method, we develop equivalent and more convenient formulations of the same solution, in terms of a convergent "message-passing" method. By defining 320 the Lagrange multipliers, see step 320, in terms of another set of quantities, called "messages," we obtain a different but equivalent set of equations for the cluster probabilities.

Our method works by treating the self-consistent equations as message update rules that are iterated until a termination condition is reached, for example, a fixed number of iterations, or the solution converges 330, at which point the marginal posterior probabilities 332 can be determined from the converged messages 340. Before the first update, we assign initial values 331 to the messages 321. The initial values can be random or special values, e.g., all random positive numbers, or all ones.

In general, there are many equivalent sets of message definitions and message-update rules that correspond to the same Kikuchi approximation. Some particular message definitions and message-update rules, which we describe later, have particularly nice properties and reduce to the already known ordinary message-passing methods when applied to the Bethe approximation. In this section, we want to describe the general properties that should be satisfied by messages so that any particular message-passing method is equivalent to the corresponding Kikuchi approximation.

We have used the marginalization relations to relate region probabilities to probabilities of their intersection regions. For the three-cluster example, equations [22]–[28] describe how the probabilities are related to the region energies, and the normalization and marginalization Lagrange multipliers. We ignore the normalization Lagrange multipliers (the $\gamma$'s) for now, knowing that these simply give a multiplicative scalar which normalizes the final probabilities.

Our goal is to express messages in terms of the $\lambda$ Lagrange multipliers. It will turn out that the marginalization constraint relations will then give us a set of fixed point equations for the messages, which we will interpret as the message update rules 321.

We stack all of the $\lambda$ Lagrange multipliers to create a vector $\vec{\lambda}$. In this vector, there is one $\lambda$ Lagrange multiplier for each linearly independent marginalization constraint, times the number of different possible variable assignments in the cluster region being marginalized down. For our three cluster example, the vector $\vec{\mu}$ includes nine sets of Lagrange multipliers: $\lambda_{1\backslash 12}(\alpha_{12})$, $\lambda_{1\backslash 31}(\alpha_{31})$, $\lambda_{2/12}(\alpha_{12})$, $\lambda_{2/23}(\alpha_{23})$, $\lambda_{3/23}(\alpha_{23})$, $\lambda_{3/31}(\alpha_{31})$, $\lambda_{12/123}(\alpha_{123})$, $\lambda_{23/23}(\alpha_{123})$, and $\lambda_{31/123}(\alpha_{123})$, which we take to be stacked in that order. The total dimensionality of the vector $\vec{\lambda}$ is $D_\lambda = 2D_{12} + 2D_{23} + 2D_{31} + 3D_{123}$, where, for example, $D_{12}$ is the dimensionality of $\alpha_{12}$.

In our example, equations [22–28] give the cluster probabilities in terms of the Lagrange multipliers $\vec{\lambda}$. We take the logarithm of all these equations, and define the local quantities $$L(\alpha) = E(\alpha) + T \ln P(\alpha) \qquad [29]$$

for each cluster. Then we summarize these equations by:

$$\vec{L} = A\lambda, \qquad [30]$$

where $\vec{L}$ is a vector of the L's in the seven regions taken in the order 1, 2, 3, 12, 23, 31, and 123, and $\vec{L}$ has dimensionality:

$$D_L = D_1 + D_2 + D_3 + D_{12} + D_{23} + D_{31} + D_{123}.$$

A is a matrix with $D_L$ rows and $D_\lambda$ columns, but it has a special block form, which we express as:

$$A = \begin{pmatrix} \tilde{1} & \tilde{1} & \tilde{0} & \tilde{0} & \tilde{0} & \tilde{0} & \tilde{0} & \tilde{0} & \tilde{0} \\ \tilde{0} & \tilde{0} & \tilde{1} & \tilde{1} & \tilde{0} & \tilde{0} & \tilde{0} & \tilde{0} & \tilde{0} \\ \tilde{0} & \tilde{0} & \tilde{0} & \tilde{0} & \tilde{1} & \tilde{1} & \tilde{0} & \tilde{0} & \tilde{0} \\ \tilde{1} & \tilde{0} & \tilde{1} & \tilde{0} & \tilde{0} & \tilde{0} & -\tilde{1} & \tilde{0} & \tilde{0} \\ \tilde{0} & \tilde{0} & \tilde{0} & \tilde{1} & \tilde{1} & \tilde{0} & \tilde{0} & -\tilde{1} & \tilde{0} \\ \tilde{0} & \tilde{1} & \tilde{0} & \tilde{0} & \tilde{0} & \tilde{1} & \tilde{0} & \tilde{0} & -\tilde{1} \\ \tilde{0} & \tilde{0} & \tilde{0} & \tilde{0} & \tilde{0} & \tilde{0} & -\tilde{1} & -\tilde{1} & -\tilde{1} \end{pmatrix} \qquad [31]$$

Each entry in this matrix actually denotes a sub-matrix. For example, the 1 in the upper left corner denotes a sub-matrix of $D_1$ rows and $D_{12}$ columns which is equal to one when the nodes in $\alpha_{12}$ agree with the corresponding nodes in $\alpha_1$, and is equal to zero otherwise. This becomes clear in a more specific example.

If region 1 includes two nodes $S_a$ and $S_b$, and region 2 includes the single node $S_b$, and each node can be in two states that we label "1" and "2," then $\alpha_1$ can be in any of the four states $S_a=1, S_b=1; S_a=1, S_b=2; S_a=2, S_b=1; S_a=2, S_b=2$ and $\alpha_{12}$ can be any of the two states $S_b=1; S_b=2$, and the sub-matrix 1 in the top left corner of A is expressed as:

$$\begin{pmatrix} 1 & 0 \\ 0 & 1 \\ 1 & 0 \\ 0 & 1 \end{pmatrix}.$$

In general, the self-consistent equations derived from a Kikuchi approximation can be summarized in the form of a matrix equation $\vec{L} = A\vec{\lambda}$ and a set of normalization and marginalization conditions.

We desire an alternative formulation for our solution in terms of "messages" and self-consistent message equations. We still use the same normalization and marginalization conditions on the cluster probabilities, but we redefine the Lagrange multipliers A in terms of messages.

We store the logarithms of all the messages between the regions in an ordered vector $\vec{m}$. To be commensurate with the Lagrange multipliers that we seek to summarize, we normally let the dimensionality of $\vec{m}$ be the same as the dimensionality of $\vec{\lambda}$. In general, the vector $\vec{m}$ can have different dimensionality than $\vec{\lambda}$, but the vector needs to span the same sub-space of constraints on the lattice so that we can re-write the Lagrange multiplier $\vec{\lambda}$ in terms of messages $\vec{m}$.

Thus, for our example, we generate sets of logarithms of messages commensurate with $\vec{\lambda}$ as $m_{1\backslash 12}(\alpha_{12})$, $m_{1/31}(\alpha_{31})$, $m_{2\backslash 12}(\alpha_{12})$, $m_{2\backslash 23}(\alpha_{23})$, $m_{3\backslash 23}(\alpha_2 3)$, $m_{3\backslash 31}(\alpha_{31})$, $M_{12\backslash 123}(\alpha_{123})$, $M_{23\backslash 123}(\alpha_{123})$, and $m_{31\backslash 123}(\alpha_{123})$. The vector m stores these messages in that order.

There is a set of self-consistent equations for the cluster probabilities in terms of the messages where the equations have the matrix form:

$$L = B\vec{m}, \qquad [32]$$

or equivalently:

$$A\vec{\lambda} = B\vec{m}, \qquad [33]$$

where B is a "selection" matrix that determines the choice of the message-passing method. This matrix is specified below.

The matrix B and the vector $\vec{m}$ constitute a valid reformulation of the Kikuchi solution as long as the system described by equation [33] has at least one solution that can be written in the form of a matrix equation:

$$\vec{m} = C\vec{\lambda}. \qquad [34]$$

Any valid reformulation of the Kikuchi solution can be used as the basis for our message-passing method.

To illustrate this idea, we return to our three-cluster example of FIG. 4$a$, for which we have already chosen the vector $\vec{m}$. We can now choose many different matrices B, but we use one that arises from a scheme that we describe in more detail below.

Recall that the m's defined above are the logarithms of messages, which we denote by M's. We now set the marginal posterior probabilities of the regions to obey the set of equations:

$$P(\alpha_1) = k_1 \exp\left(-\frac{E(\alpha_1)}{T}\right) M_{3\backslash 31}(\alpha_{31}) M_{2\backslash 12}(\alpha_{12}) M_{23\backslash 123}(\alpha_{123}) \qquad [35]$$

$$P(\alpha_2) = k_2 \exp\left(-\frac{E(\alpha_2)}{T}\right) M_{1\backslash 12}(\alpha_{12}) M_{3\backslash 23}(\alpha_{23}) M_{31\backslash 123}(\alpha_{123}) \qquad [36]$$

$$P(\alpha_3) = k_3 \exp\left(-\frac{E(\alpha_3)}{T}\right) M_{1\backslash 31}(\alpha_{31}) M_{2\backslash 23}(\alpha_{23}) M_{23\backslash 123}(\alpha_{123}) \qquad [37]$$

$$P(\alpha_{12}) = \qquad [38]$$
$$k_{12} \exp\left(-\frac{E(\alpha_{12})}{T}\right) M_{1\backslash 12}(\alpha_{12}) M_{2\backslash 12}(\alpha_{12}) M_{23\backslash 123}(\alpha_{123}) M_{31\backslash 123}(\alpha_{123})$$

-continued $$P(\alpha_{23}) = \quad [39]$$
$$k_{23}\exp\left(-\frac{E(\alpha_{23})}{T}\right)M_{3\backslash 23}(\alpha_{23})M_{3\backslash 23}(\alpha_{23})M_{12\backslash 123}(\alpha_{123})M_{31\backslash 123}(\alpha_{123})$$

$$P(\alpha_{31}) = \quad [40]$$
$$k_{31}\exp\left(-\frac{E(\alpha_{31})}{T}\right)M_{1\backslash 31}(\alpha_{31})M_{3\backslash 31}(\alpha_{31})M_{12\backslash 123}(\alpha_{123})M_{23\backslash 123}(\alpha_{123})$$

$$p(\alpha_{123}) = k_{123}\exp\left(-\frac{E(\alpha_{123})}{T}\right)M_{12\backslash 123}(\alpha_{23})M_{23\backslash 123}(\alpha_{123})M_{31\backslash 123}(\alpha_{123}), \quad [41]$$

where again the k's are normalization constants that vary for each equation, as for equations [22–28] above.

Taking the logarithm of these equations, and recalling the order of the m's given above, we see that equations [35–41] are equivalent to the choice $$B = \begin{pmatrix} \tilde{0} & \tilde{0} & \tilde{1} & \tilde{0} & \tilde{0} & \tilde{1} & \tilde{0} & \tilde{1} & \tilde{0} \\ \tilde{1} & \tilde{0} & \tilde{0} & \tilde{0} & \tilde{1} & \tilde{0} & \tilde{0} & \tilde{0} & \tilde{1} \\ \tilde{0} & \tilde{1} & \tilde{0} & \tilde{1} & \tilde{0} & \tilde{0} & \tilde{1} & \tilde{0} & \tilde{0} \\ \tilde{1} & \tilde{0} & \tilde{1} & \tilde{0} & \tilde{0} & \tilde{0} & \tilde{0} & \tilde{1} & \tilde{1} \\ \tilde{0} & \tilde{0} & \tilde{0} & \tilde{1} & \tilde{1} & \tilde{0} & \tilde{1} & \tilde{0} & \tilde{1} \\ \tilde{0} & \tilde{1} & \tilde{0} & \tilde{0} & \tilde{0} & \tilde{1} & \tilde{1} & \tilde{1} & \tilde{0} \\ \tilde{0} & \tilde{0} & \tilde{0} & \tilde{0} & \tilde{0} & \tilde{0} & \tilde{1} & \tilde{1} & \tilde{1} \end{pmatrix}. \quad [42]$$

The choice of B and $\vec{m}$ give an equivalent reformulation of the region probabilities when there is a solution to the equation:

$$\vec{m} = C\vec{\lambda} \quad [43]$$

where $$C = B^{+}A, \quad [44]$$

and $B^{+}$ is the pseudo-inverse of B. Of course, we can always compute a C matrix as above, but for the matrix to represent a true solution, we must verify that matrix equation $$BC = A \quad [45]$$

is satisfied.

If a solution to $A\vec{\lambda} = B\vec{m}$ exists for a particular choice of matrix B and message vectors $\vec{m}$, we discard the original Lagrange multipliers $\lambda$ and work entirely with the messages. In this case, we guarantee that the self-consistent equations for the messages will ultimately give the same cluster probabilities as those given by the Kikuchi approximation.

The next step is to determine the self-consistent equations for the messages. To do this, we need to combine the equations for the cluster probabilities in terms of messages with the marginalization conditions on the cluster probabilities. In terms of our example, we use, for instance, the equation $P(\alpha_{12}) = \Sigma_{\alpha_{1\backslash 12}} P(\alpha_1)$ along with the equations for $P(\alpha_1)$ and $P(\alpha_{12})$ in terms of messages to obtain $$M_{1\backslash 12}M_{3\backslash 123} = k\sum_{\alpha_{1\backslash 12}}\exp\left(\frac{E(\alpha_{12}) - E(\alpha_1)}{T}\right)M_{3\backslash 31}, \quad [46]$$

where k is again a normalization constant. In all, there will be one such equation for each marginalization constraint.

We use the $D_\lambda$ equations of the form of equation [46] in our message-passing method, by interpreting them as message-update rules. In this interpretation, any messages on the right-hand-side of an equation are treated as the messages at iteration t, while the messages on the left-hand-side of the equation are the desired messages at iteration t+1. We start, for example, with random messages 331, and at each iteration replace the "old" messages on the right hand side of the equation with "new" messages from the left-hand side. In practice, the messages usually converge to a fixed point. When they converge, the fixed point corresponds to the solution in which we are interested.

As for all methods of this type, we can update the messages synchronously or asynchronously, and we can update the messages with some linear combination of the "old" and "new" messages. Our method is an iterative method for the solution of nonlinear equations, and as such, its convergence properties may be improved by using standard prior-art techniques for such methods, see "Iterative Methods for Linear and Nonlinear Equations", C. T. Kelley, 1995.

Regarding the normalization constants k, we could continue to set these normalization constants by requiring that the total cluster probabilities sum to one. However, another procedure that works equally well, and is easy to implement, temporarily scales the messages by requiring that the sum of all the components of a message to equal a given arbitrary constant while iterating the self-consistent equations. Reasonable choices for the constant are one, or the dimensionality of the message. Thus, for instance, we can require that:

$$\sum_{\alpha_{12}} M_{1\backslash 12}(\alpha_{12}) = 1. \quad [47]$$

After iterating the message equations to convergence, we re-scale the messages to guarantee that the region probabilities are properly normalized.

We have described the messages as being associated with a region r and one of its direct sub-regions s. We can equivalently describe the message as going from a set of "source" nodes to a set of "destination" nodes. The "source" nodes are those nodes in region r that are not in direct sub-region s, while the "destination" nodes are those nodes in s.

To obtain probability functions defined on a subset of the nodes in a region, one simply marginalizes the region probability by summing it over those nodes that are in the region but not in the subset of interest.

We can also determine the maximum a posteriori probability values of the nodes in a region rather than the region probabilities. For the prior-art "standard" belief propagation method, a simple modification suffices to obtain the approximate MAP values of the nodes. The necessary modification is to replace all sums over node values in the message-update rules with the value of the maximum, i.e., the "argmax," over the same node values. The same modification can also be used to obtain the MAP values of regions for our method. Alternatively, we can use the physics formulation of the Markov network, and set the temperature T to a very small positive constant. In the limit T→0, we recover region probabilities that are entirely dominated by the MAP values of the nodes.

The message-update equations for some arbitrary B matrix is not, in general, convenient to solve. With an arbitrary B matrix, one might find that a message between two nodes on one side of the network would depend on messages between other nodes that are very far away. This is an undesirable property, both because it seems unintuitive, and because it means that solving the message-update equations will involve matrix multiplications with very large matrices. Finding the free energy for arbitrary B matrices also involve large matrix multiplications or inversions.

In order that iterating the message update equations be an efficient operation, we desire that the matrix B is sparse and local, i.e., only a few non-zero elements for each row or column, and only nearby messages influence each other.

In the next section, we describe a "canonical" message-passing method that yields these desired properties.

A Canonical Method

In the previous section, we described the properties that must be satisfied by messages and their associated message-update rules, which we call the "message-passing method," in order that the messages give results equivalent to the Kikuchi approximation. In general, there may be many different message-passing methods that are all equivalent to the same Kikuchi approximation. In this section, we describe how to select one particular message-passing method that we call the "canonical" method.

Our canonical method gives the same message-update rules as the standard loopy message-passing method when applied at the level of the Bethe approximation. More generally, and as an advantage, our canonical method leads to local message-update rules that are relatively easy and convenient to solve because they correspond to a sparse B matrix.

We start with a Markov network with local compatibility functions $\phi_{ij}$ and evidence functions $\psi_i$. The overall probability of a configuration of states $s_a, s_b, \ldots$ is expressed as.

$$P(s_a, s_b, \ldots) = \frac{1}{Z} \prod_{i,j} \phi_{ij}(s_i, s_j) \prod_i \psi_i(s_i), \quad [48]$$

where the first product runs over all linked neighbors, i and j.

Figure 5:
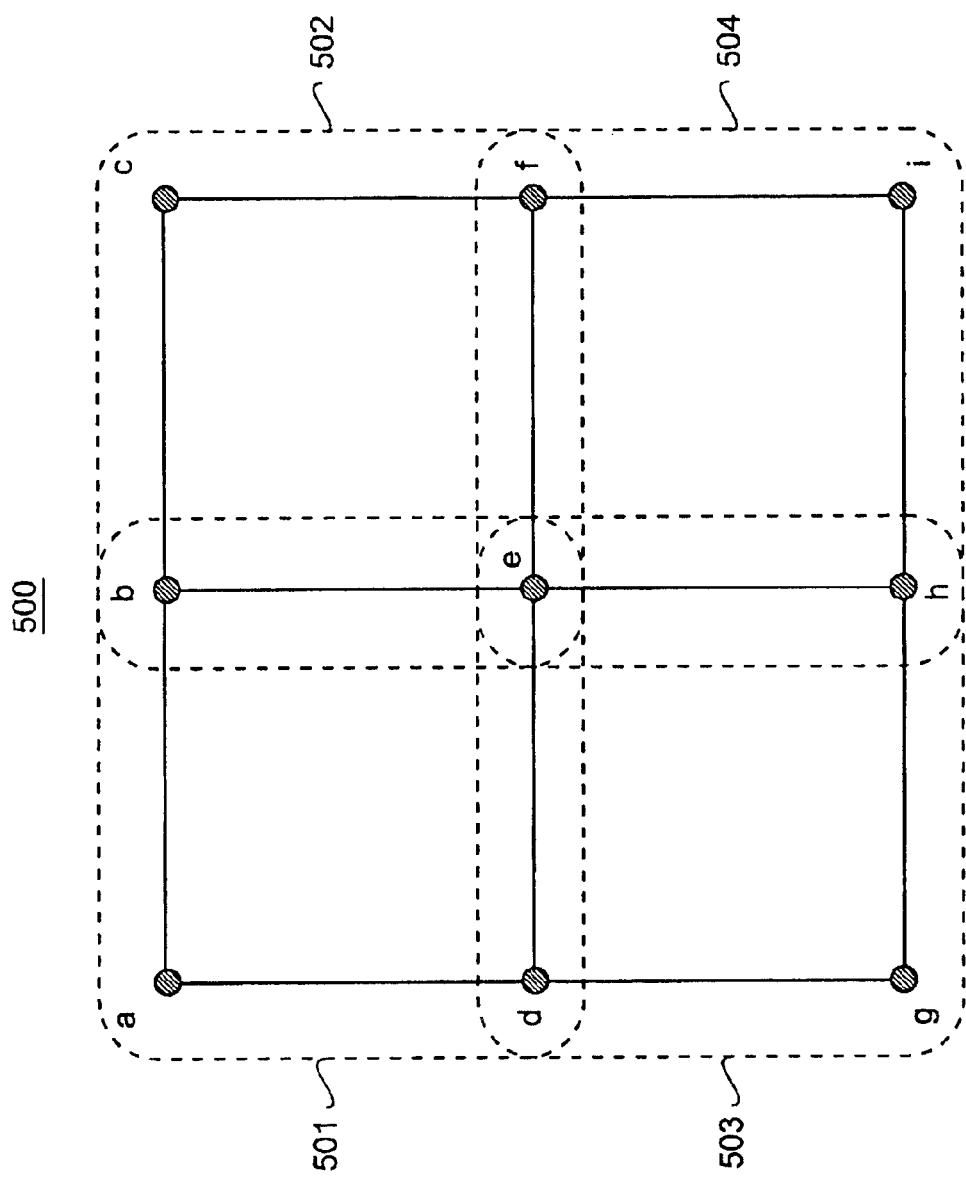
FIG. 5 is a graph of a nine node network grouped into four intersecting clusters.

Using FIG. 5, we illustrate this procedure with a specific example. In this example, nine nodes labeled a through i, are arranged in a 3×3 lattice 500. The only statistical dependencies or links $\phi_{ij}(s_i, s_j)$ included are the ones connecting nearest neighbors in the lattice.

General Procedure

Figure 6:
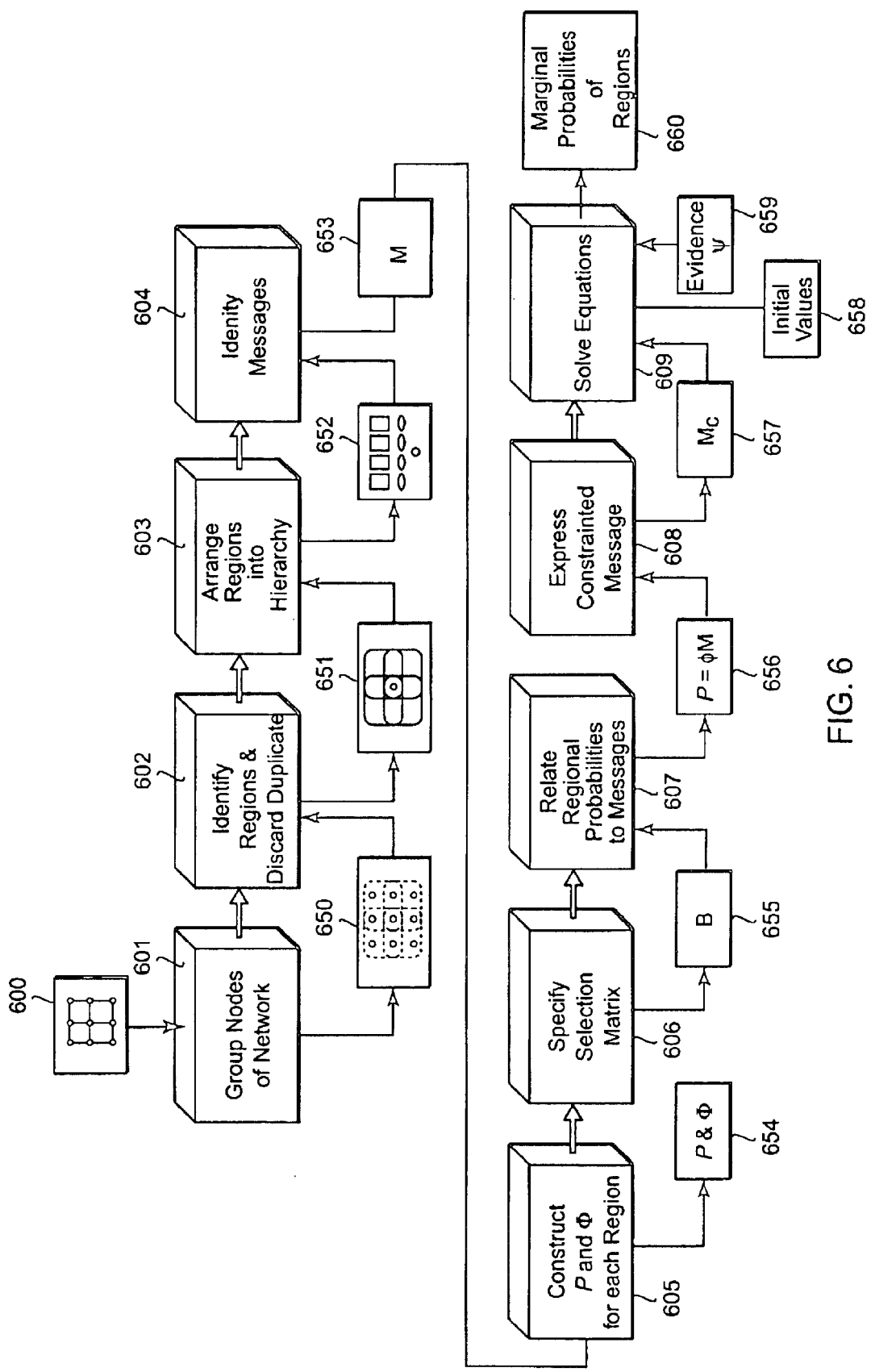
FIG. 6 is a flow diagram of detailed steps of the method according to the invention.

The detailed steps of a general method is described with respect to FIG. 6. In step 601, a network 600 of nodes and links is grouped 601 into clusters or "super-nodes" 650 to be used in the approximation. These clusters can have a simple geometric shape, repeated over the lattice. Alternatively, the clusters can be triangles or squares of an irregular network, or the clusters can be some other arbitrary choice of node clusters best suited for the approximation. The set of clusters must cover all the links in the Markov network, and the clusters must be small enough so that we are able to perform the generalized belief propagation operations described below.

In our example, we group the network 500 into clusters: (abde), (bcef), (degh), and (efhi) 501–504 of FIG. 5. This set of clusters "covers" the lattice 500. That is, every link between nodes which influence each other is completely included in at least one of the four clusters we have selected. Of course, we can select a different collection of clusters which completely covers the lattice. That would just be a different Kikuchi approximation.

As stated before, the size of the clusters is proportional to the accuracy of the approximation. If we chose a cluster (abcdefghi), i.e., all the nodes in the system, then our approximation is exact. While that grouping may be feasible with such a small example, in general, we will perform summations whose number grows exponentially with the size of the cluster. Therefore, in a practical application, the number of nodes in a cluster is limited.

The prior art Bethe approximation is obtained when we select as the clusters all the pairs of nodes that influence each other. In our example, that would mean partitioning the nodes pairwise into clusters (ab), (bc), (de), (ef), (gh), (hi), (ad), (be), (cf), (dg), (eh), and (fi). Because our four clusters are larger than the twelve clusters of the Bethe approximation, we obtain more accurate results.

In step 602, we identify a collection of relevant regions 651 by recursively generating intersections of clusters, for our example, the regions, (be), (de) (fe), (he), and (e). We discard duplicate regions.

Figure 7:
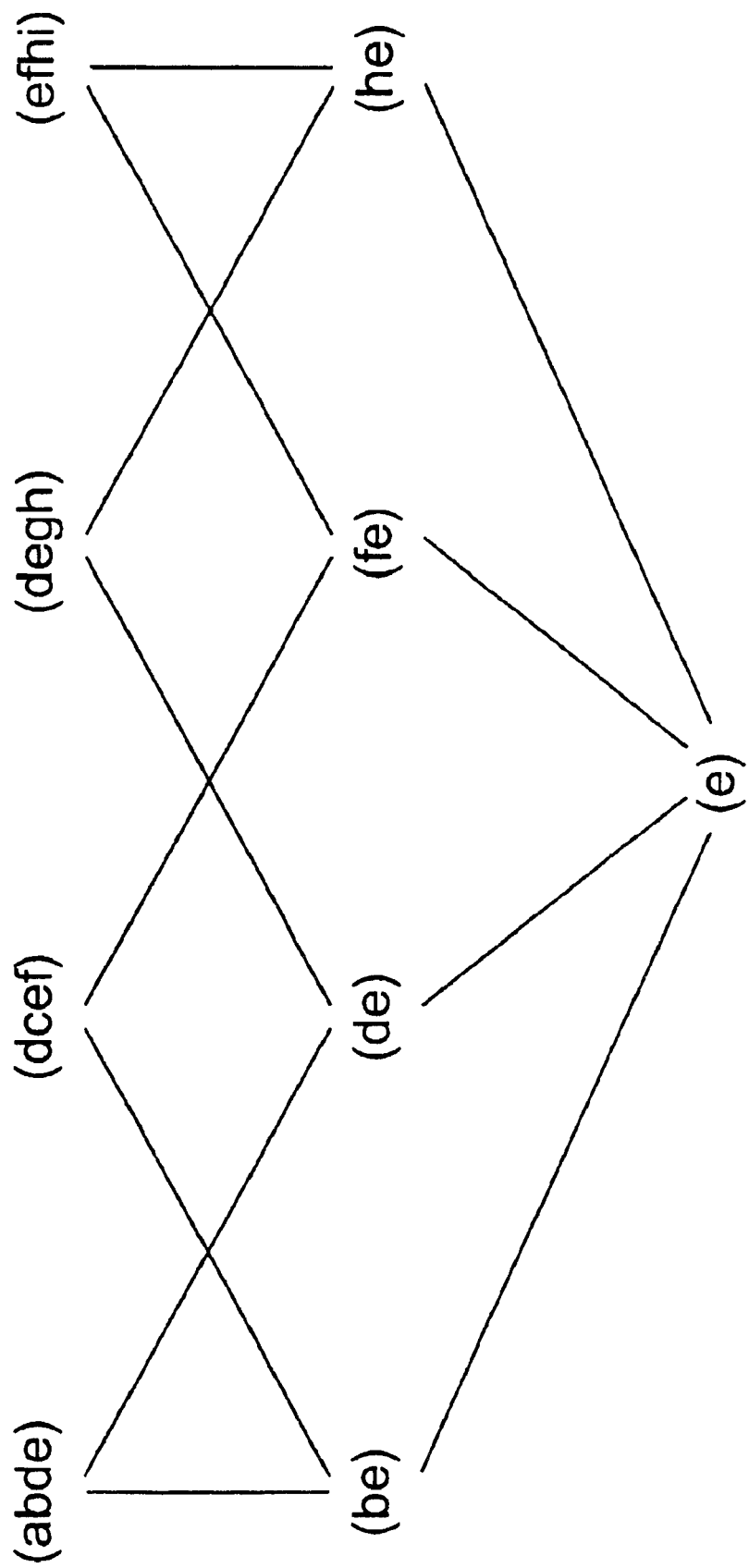
FIG. 7 is a graph of a hierarchy of regions.

In step 603, we arrange the regions into a top-to-bottom hierarchy 652 of their intersections. The hierarchy for our specific example is shown in more detail in FIG. 7. This hierarchy has the property that each region is connected only to its "direct sub-regions" and "direct super-regions." A sub-region s is a "direct sub-region" of another region r if there are no other regions in our collection that are super-regions of s and sub-regions of r. In our example, regions (be) and (de) are both direct sub-regions of region (abde), but region (e) is not. Region r is a direct super-region of region s if and only if region s is a direct sub-region of region r.

In step 604, we identify messages M 653 which connect all regions with their direct sub-regions. In our example, we would identify messages $M_{abde\backslash be}$, $M_{abde\backslash de}$, $M_{bcef\backslash be}$, $M_{bcef\backslash fe}$, $M_{degh\backslash de}$, $M_{degh\ he}$, $M_{efhi\backslash fe}$, $M_{efhi\backslash he}$, $M_{be\backslash e}$, $M_{de\backslash e}$, $M_{fe\backslash e}$, and $M_{he\backslash e}$.

We can identify these messages using a more compact notation that we illustrate with one example:

$$M_{be}^{ad} \equiv M_{abde\backslash be}. \quad [47]$$

For this message, we send a message from the upper nodes a and d to the lower nodes b and e. We can consider the upper nodes to be the "source" nodes for the message, and the lower nodes to be the "destination" nodes. Each of the messages between a region and its direct sub-region has dimensionality corresponding to the dimensionality of the sub-region. Thus, $M_{be}^{ad}$ has the same dimensionality as region (be). When we want to emphasize that fact, we express the message as $M_{be}^{ad}(s_b, s_e)$.

In step 605, we construct a probability function $P(\alpha_R)$ and a local potential $\Phi(\alpha_R)$ for each region R. We construct a vector $\vec{L}$ out of the quantities $L(\alpha) \equiv \ln P(\alpha) - \ln \Phi(\alpha)$. For our example, we need to construct probabilities $P(s_a, s_b, s_d, s_e)$, $P(s_b, s_c, s_e, s_f)$, $P(s_d, s_e, s_g, s_h)$, $P(s_e, s_f, s_h, s_i)$, $P(s_b, s_e)$, $P(s_d, s_e)$, $P(s_f, s_e)$, $P(s_h, s_e)$ and $P(s_e)$. The local potentials $\Phi(\alpha_R)$ are constructed by combining all the original potentials $\phi_{ij}$ and $\psi_i$ that belong to the region R. Thus, for example, $$\Phi(s_a, s_b, s_d, s_e) = \phi_{ab}(s_a, s_b)\phi_{ad}(s_a, s_d)\phi_{be}(s_b, s_e)\phi_{de}(s_d, s_e)\psi_a(s_a)\psi_b(s_b)\psi_d(s_d)\psi_e(s_e), \quad [48]$$

while $\Phi(s_b, s_e) = \phi_{be}(s_b, s_e)\psi_b(s_b)\psi_e(s_e)$ and $\Phi(s_e) = \psi_e(s_e)$ Each probability function has the dimensionality of the region it describes. For example, if node b can be in any of three states and node e can be in any of four states, then $P(\alpha_{be})$ is described by 3*4=12 numbers.

In step 606, we specify the matrix B 656 that determines the selection of the message-passing method. This matrix will operate on the vector $\vec{m}$ created from the logarithms of the messages specified in step 604. The matrix B has a block form that we explained when describing equation [33]. This special block form "hides" the details of the different possible values of the nodes within each message or region. Using this block form, the matrix B 655 has $N_R$ rows and $N_M$ columns, where $N_R$ is the number of regions, and $N_M$ is the number of messages. Each entry in the matrix is either a 0 matrix or a 1 matrix. We determine the entries of the matrix B by the following sub-step 606 for each entry:

(a) Label the region corresponding to the row of the entry $R_R$, and the region and sub-region of the message corresponding to the column of the entry $R_C$ and $S_C$ respectively. By $R_C \backslash S_C$, we denote the set of nodes that are in $R_C$ but not in $S_C$.

(b) If the nodes in SC are the same as the nodes in $R_R$, or if the nodes are a sub-set of the nodes in $R_R$, and if all the nodes in $R_C \backslash S_C$ are not in $R_R$, then the entry is a 1 matrix. Otherwise, the entry is a 0 matrix.

Explained more intuitively, this rule says that every region gets messages that start at source nodes that are outside of the region and end at destination nodes that are inside of the region. In our example, assuming the regions are listed in the order (abde), (bcef), (degh), (efhi), (be), (de), (fe), (he), (e), and the messages are ordered as we listed them above, the matrix B is:

$$B = \begin{pmatrix} \bar{0} & \bar{0} & \bar{1} & \bar{0} & \bar{1} & \bar{0} & \bar{0} & \bar{0} & \bar{0} & \bar{1} & \bar{1} \\ \bar{1} & \bar{0} & \bar{0} & \bar{0} & \bar{0} & \bar{0} & \bar{1} & \bar{0} & \bar{0} & \bar{1} & \bar{0} & \bar{0} \\ \bar{0} & \bar{1} & \bar{0} & \bar{0} & \bar{0} & \bar{0} & \bar{0} & \bar{1} & \bar{1} & \bar{0} & \bar{1} & \bar{0} \\ \bar{0} & \bar{0} & \bar{0} & \bar{1} & \bar{0} & \bar{1} & \bar{0} & \bar{0} & \bar{1} & \bar{1} & \bar{0} & \bar{0} \\ \bar{1} & \bar{0} & \bar{1} & \bar{0} & \bar{0} & \bar{0} & \bar{0} & \bar{0} & \bar{0} & \bar{1} & \bar{1} & \bar{1} \\ \bar{0} & \bar{1} & \bar{0} & \bar{0} & \bar{1} & \bar{0} & \bar{0} & \bar{0} & \bar{1} & \bar{0} & \bar{1} & \bar{1} \\ \bar{0} & \bar{0} & \bar{0} & \bar{1} & \bar{0} & \bar{0} & \bar{1} & \bar{0} & \bar{1} & \bar{1} & \bar{0} & \bar{1} \\ \bar{0} & \bar{0} & \bar{0} & \bar{0} & \bar{0} & \bar{1} & \bar{0} & \bar{1} & \bar{1} & \bar{1} & \bar{1} & \bar{0} \\ \bar{0} & \bar{0} & \bar{0} & \bar{0} & \bar{0} & \bar{0} & \bar{0} & \bar{0} & \bar{1} & \bar{1} & \bar{1} & \bar{1} \end{pmatrix} \quad [49]$$

We explain one of these entries: the 1 matrix in the first row, third column. The first row corresponds to the region (abde), while the third column corresponds to the message $M_{be}{}^{cf}$. Both the nodes c and f are outside of the region (abde) and both the nodes b and e are inside the region (abde), so the conditions for choosing a 1 matrix are met for this entry.

One important advantage of this rule is that when it is applied to the messages and regions obtained from the Bethe approximation, the rule will always result in a matrix B that will ultimately yield the standard "loopy" belief propagation. Another important advantage is that this rule will normally give back a matrix B that results in a system of equations $\vec{A\lambda} = \vec{Bm}$ that is solvable. Another advantage is that this rule will result in a B matrix that is sparse and local.

In step 607, we exponentiate the equations represented by the matrix equation $\vec{L} = \vec{Bm}$ to obtain the equations 656 relating the region probabilities to the messages. For our example, we obtain nine equations from the nine rows of the matrix equation. As an example, we show how to construct the equation for the first row. The first row of the B matrix corresponds to the region (abde). Reading across the first row, we see that there are 1 sub-matrices in the third, fifth, eleventh, and twelfth columns, which correspond to the messages $M_{be}{}^{cf}$, $M_{de}{}^{gh}$, $M_e{}^f$, and $M_e{}^h$ Therefore, the equation for the first row is:

$$P(s_a, s_b, s_d, s_e) = \Phi(s_a, s_b, s_d, s_e) M_{be}{}^{cf}(s_b, s_e) M_{de}{}^{gh}(s_d, s_e) M_e{}^f(s_e) M_e{}^h(s_e) \quad [50]$$

The other equations are constructed in the same way. For example, the equation for the fifth row is $$P(\text{i } s_b, s_e) = \Phi(\text{i } s_b, s_e) M_{be}{}^{ad}(\text{i } s_b, s_e) M_{be}{}^{cf}(s_b, s_e) M_e{}^d(s_e) M_e{}^f(s_e) M_e{}^h(s_e) \quad [51]$$

In step 608, we express the $N_m$ constraint equations on the region probabilities, and substitute in equations relating the region probabilities to the messages in order to obtain a set of self-consistent equations $M_c$ (update rules) for messages 657.

In our example, we have twelve constraint equations. In the canonical method, there are always exactly as many constraint equations as there are messages. One of the constraint equations in our example relates $P(s_a, s_b, s_d, s_e)$ to $P(s_b, s_e)$:

$$P(s_b, s_e) = \sum_{s_b, s_e} P(s_a, s_b, s_d, s_e). \quad [52]$$

Using the results from the previous step, we obtain the self-consistent equation for the messages from the marginalization (abde)→(be):

$$M_{be}^{ad}(s_b, s_e) M_e^d(s_e) = \quad [53]$$
$$\sum_{s_a s_d} \phi_{ab}(s_a, s_b) \phi_{ad}(s_a, s_d) \phi_{be}(s_b, s_e) \psi_a(s_a) \psi_d(s_d) M_{de}^{gh}(s_d, s_e).$$

Eleven other similar equations can be obtained from the constraint equations. From the marginalization of region (abde)→(de) we obtain:

$$M_{de}^{ad}(s_d, s_e) M_e^b(s_e) = \quad [54]$$
$$\sum_{s_a s_b} \phi_{ad}(s_a, s_d) \phi_{ab}(s_a, s_b) \phi_{de}(s_d, s_e) \psi_a(s_a) \psi_b(s_b) M_{be}^{cf}(s_d, s_e)$$

From $(bcef) \to (be)$:

$$M_{be}^{cf}(s_b, s_e) M_e^f(s_e) = \quad [55]$$
$$\sum_{s_c s_f} \phi_{bc}(s_b, s_c) \phi_{cf}(s_c, s_f) \phi_{be}(s_b, s_e) \psi_c(s_c) \psi_f(s_f) M_{fe}^{ik}(s_f, s_e)$$

From $(bcef) \to (fe)$:

$$M_{fe}^{cb}(s_f, s_e) M_e^b(s_e) = \quad [56]$$
$$\sum_{s_c s_b} \phi_{fc}(s_f, s_c) \phi_{cb}(s_c, s_b) \phi_{fe}(s_f, s_e) \psi_b(s_b) \psi_f(s_f) M_{be}^{ad}(s_b, s_e)$$

From $(degh) \to (de)$:

$$M_{de}^{gh}(s_d, s_e) M_e^h(s_e) = \quad [57]$$
$$\sum_{s_g s_h} \phi_{dg}(s_d, s_g) \phi_{gh}(s_g, s_h) \phi_{hc}(s_h, s_c) \psi_g(s_g) \psi_h(s_h) M_{he}^{if}(s_h, s_c)$$

From $(degh) \to (he)$:

$$M_{he}^{gd}(s_h, s_c) M_c^d(s_e) = \quad [58]$$
$$\sum_{s_g s_d} \phi_{gh}(s_g, s_h) \phi_{gd}(s_g, s_d) \phi_{de}(s_d, s_e) \psi_d(s_d) \psi_g(s_g) M_{dc}^{ab}(s_d, s_c)$$

From $(efhi) \to (fe)$:

$$M_{fe}^{ih}(s_f, s_e) M_e^h(s_c) = \quad [59]$$
$$\sum_{s_i, s_h} \phi_{fi}(s_f, s_i) \phi_{hi}(s_h, s_i) \phi_{fe}(s_f, s_e) \psi_h(s_h) \psi_i(s_i) M_{he}^{gd}(s_h, s_e)$$

-continued

From $(efhi) \rightarrow (he)$:

$$M_{he}^{fi}(s_h, s_e) M_e^f(s_e) = \sum_{s_i s_j} \phi_{hi}(s_h, s_i) \phi_{fi}(s_f, s_i) \phi_{fe}(s_f, s_e) \psi_f(s_f) \psi_i(s_i) M_{fe}^{cb}(s_f, s_e) \quad [60]$$

From $(be) \rightarrow (e)$:

$$M_c^b(e) = \sum_{s_b} \phi_{be}(s_b, s_e) \psi_b(s_b) M_{be}^{ad}(s_b, s_e) M_{be}^{cf}(s_b, s_e) M_b^a(s_b) M_b^c(s_b) \quad [61]$$

From $(de) \rightarrow (e)$:

$$M_e^d(e) = \sum_{s_d} \phi_{de}(s_d, s_e) \psi_d(s_d) M_{de}^{ab}(s_d, s_e) M_{de}^{gf}(s_d, s_e) M_d^a(s_d) M_d^g(s_d) \quad [62]$$

From $(fe) \rightarrow (e)$:

$$M_e^f(e) = \sum_{s_f} \phi_{fe}(s_f, s_e) \psi_f(s_f) M_{fe}^{cb}(s_f, s_e) M_{fe}^{ih}(s_f, s_e) M_f^c(s_f) M_f^i(s_f) \quad [63]$$

From $(he) \rightarrow (e)$:

$$M_c^h(e) = \sum_{s_h} \phi_{he}(s_h, s_e) \psi_h(s_h) M_{he}^{gd}(s_h, s_e) M_{he}^{if}(s_h, s_e) M_h^g(s_h) M_h^i(s_h). \quad [64]$$

In step 609, we solve the self-consistent message equations 657 by iteratively updating the values according to the rules, beginning with some initial message values 658 and some "evidence" ψ659. The initial values 658 can be random or special values, e.g., all random positive numbers, or all ones. The "evidence" is given by the values of the Variables.

For this sub-step, there are no guarantees of convergence, though for many cases in practice, such systems of equations will quickly converge. One can continue updating the message-update equations until they satisfy some termination condition, or alternatively stop after a given number of iterations.

For our example, in order to obtain some numerical results, we need to specify the values of the variables defining the model. We choose the case where all the nodes can be in one of two states, and where the local potentials $\phi_{ij}(s_i, s_j)$ can be written as:

$$\phi_{ij}(s_i, s_j) = \begin{pmatrix} \exp(J_{ij}/T)\exp(-J_{ij}/T) \\ \exp(-J_{ij}/T)\exp(J_{ij}/T) \end{pmatrix}, \quad [65]$$

where $J_{ij}$ is a bond strength and T is the temperature parameter. This is known as the Ising model of statistical physics. We set all the bond strengths between nearest neighbors $J_{ij}=1$ and the temperature T=2. We also set the $\psi_i(s_i)$ "evidence" potentials to be uniform for all nodes i:

$$\psi_i(s_i) = \begin{pmatrix} 1 \\ 1 \end{pmatrix}. \quad [66]$$

This corresponds to the Ising model in a zero field.

Convergent dynamics are obtained for this model by taking, at each iteration, the new messages to be an average of the "old" messages and the new computed messages. The messages from one node to one node are determined first, and then these results are used to determine the two node to two node messages. In general, one can order the message-update equations so that the messages that depend on the fewest nodes are solved first, so that those results can be used on the left-hand-side of the equations for the later messages.

Next, we solve for the region marginal probabilities 660 using the converged values of the messages and the equations 656 previously derived. We insure that the region probabilities are normalized so that they sum to one.

Interestingly, for our example, the final messages obtained from a "run" depends on the initial messages. However, the final converged region probabilities derived from the final messages always are the same. This reflects a general phenomena, which is the fact that when there are more messages than regions, the messages form an over-complete representation of the region probabilities.

The numerical results obtained using our four cluster Kikuchi approximation are excellent and much better than those obtained from the prior art pairwise Bethe approximation.

To take one example, the exactly computed value of the probability function $P(s_b, s_e)$ is, to six significant digits:

$$P(s_b, s_e) = \begin{pmatrix} 0.406496 & 0.093504 \\ 0.093504 & 0.406496 \end{pmatrix}. \quad [66]$$

Our approximation yields:

$$P(s_b, s_e) = \begin{pmatrix} 0.406659 & 0.093341 \\ 0.093341 & 0.406659 \end{pmatrix}. \quad [67]$$

while the result from standard belief propagation, equivalent to using the Bethe approximation, is:

$$P(s_b, s_e) = \begin{pmatrix} 0.365529 & 0.134471 \\ 0.134471 & 0.365529 \end{pmatrix}. \quad [68]$$

Thus, our generalized belief propagation method has eliminated more than 99.6 percent of the error associated with the prior art "standard" belief propagation in this case. This is a significant improvement over the prior art.

Calculating other numerical quantities gives similar improvements for our example.

Determining the Kikuchi Free Energy

So far, we have described a process for generating message-passing methods. We have not yet mentioned the Kikuchi free energy calculations that motivated our work. In fact, our method as described above has practical use by itself. On the other hand, for some applications, our method may be of interest to determined the Kikuchi free energy, as well as other physical quantities, such as the internal energy, the entropy, the specific heat, magnetizations, susceptibilities, and possible critical temperatures that can be derived from the Kikuchi free energy.

The Kikuchi approximation to the Gibbs free energy includes the following parts: the internal energy (enthalpy) U, entropic term −TS, and Lagrange multiplier terms constraining the normalization and marginalizations of the region probabilities. The full formula for the Kikuchi approximation to the Gibbs free energy is given in equation [14].

For the internal energy and entropy parts, one must remember to weight each region's contribution by its overcounting number dr. After the message-passing method has converged, the Lagrange multiplier terms all sum to zero and can be ignored, because the corresponding constraints are satisfied.

Application of the Canonical Generalized Belief Propagation Method to Some Important Markov Networks It may be helpful if we explicitly express the equations obtained using the described canonical method for some common Markov networks. We consider a square lattice with clusters consisting of all the four-node squares in the lattice, and a triangular lattice with clusters consisting of all the three-node triangles in the lattice.

Square Lattice

Figure 1:
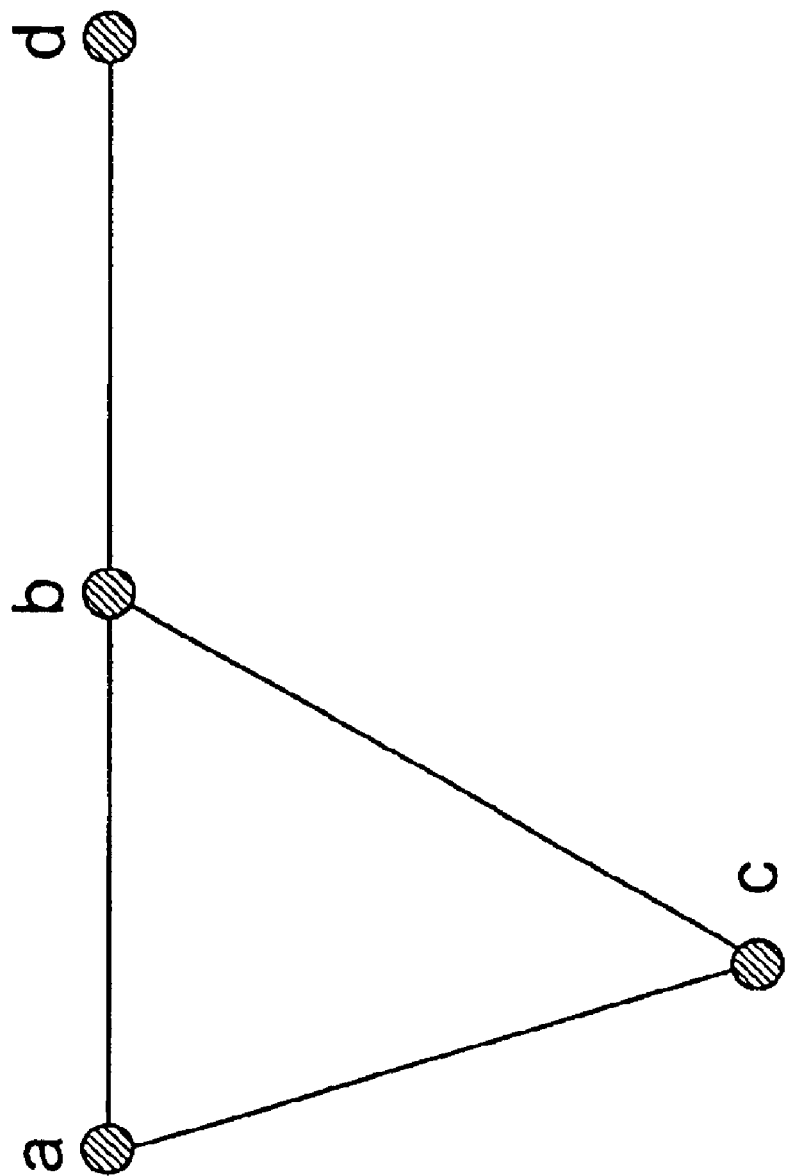
FIG. 1 is graph of a network with four nodes and links.
Figure 2B:
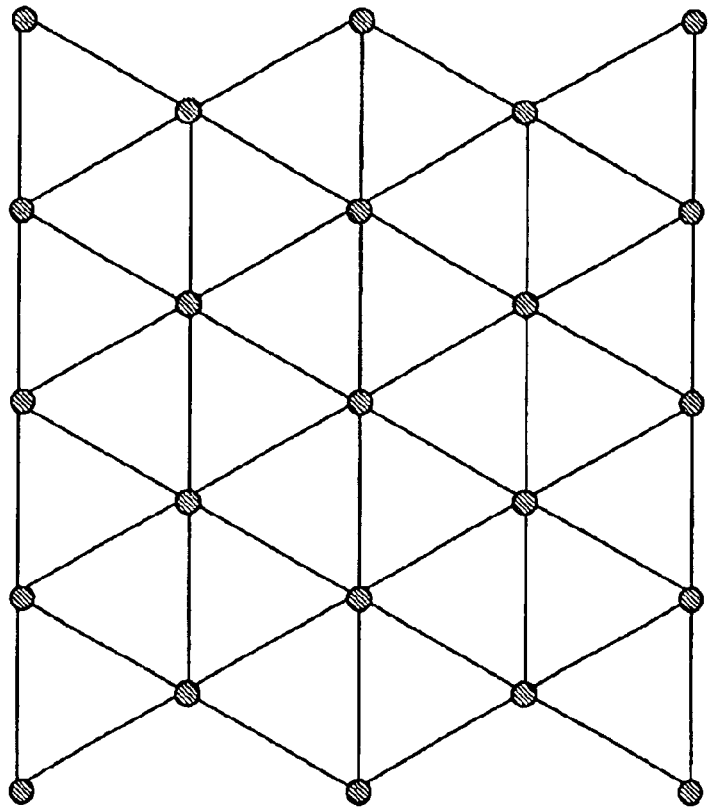
FIG. 2b is a graph of a triangular network.
Figure 2A:
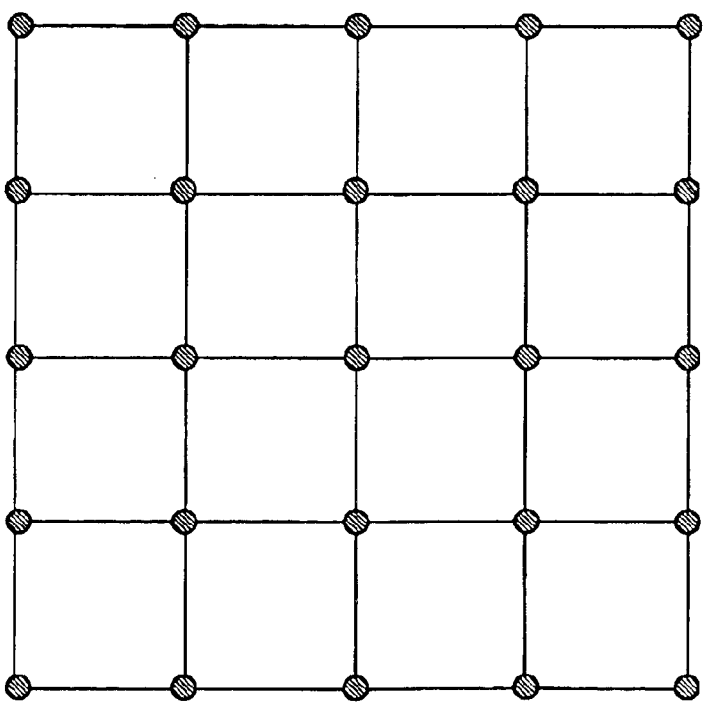
FIG. 2a is a graph of a square network.

In a square lattice of nodes each node is connected to its four nearest neighbors. FIG. 2(a) is an example of a square lattice. This is an important Markov network for image processing or computer vision applications. Using each possible four-node loop as a cluster, we derive a set of message-passing rules which improve the accuracy of the computed marginal probabilities over the Bethe approximation's performance. To obtain improved performance, we introduce double-indexed messages, i.e., arrays of numbers, in addition to the single-indexed messages, i.e., vectors that are part of the Bethe approximation message-passing.

Following the implementation rules described above, we derive the message-passing rules, and marginal probabilities in terms of those messages. These, we list below. We list only the marginalization and propagation equations for the regions away from the edges of the array of nodes.

The regions obtained from the intersections of the original square clusters are regions consisting of two nodes connected by a link, and regions consisting of a single node.

Figure 8C:
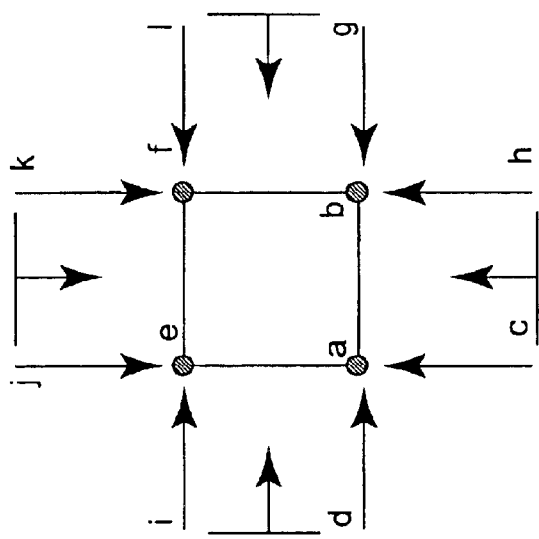
FIGS. 8a–c are graphs of belief propagation for a rectangular network.
Figure 8B:
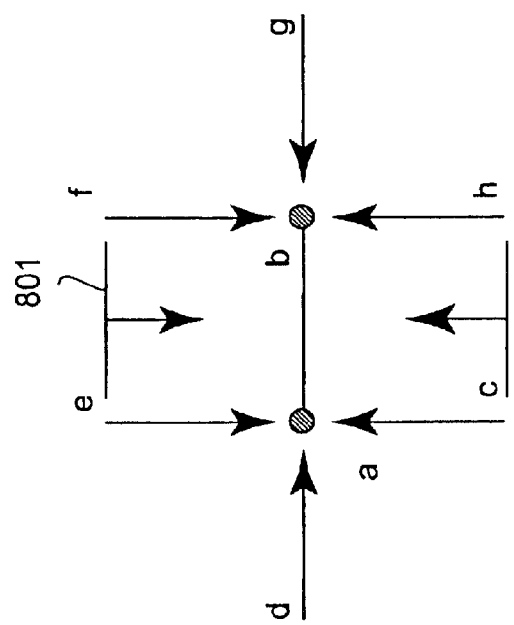
Figure 8A:
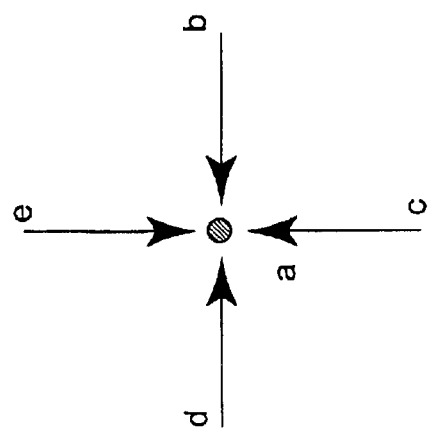

The marginal probability of a region consisting of a single node is expressed as:

$$P(S_a) = M_a^c M_a^b M_a^c M_a^d \psi_a, \qquad [73]$$

where $P(S_a)$ is the marginal probability for each of the different possible states $S_a$, of the random variable at node a, and $M_a^e$ is the converged value of the message from ource node e to destination node a, and similarly for the messages from the other nodes neighboring node a. Each of those messages is a vector of the dimensionality of the number of different possible states at node a. To avoid cluttering these formulae, we have not suppressed the functional dependence of the messages; to make it explicit, one would write for example $M_a^d(S_a)$. FIG. 8(a) is a graphical representation of equation [73]. Each arrow symbolizes a single-indexed message.

The marginal probability of a region consisting of two linked nodes is expressed as:

$$P(S_a, S_b) = M_a^e M_a^c M_a^d M_b^f M_b^g M_b^h M_{ab}^{ef} M_{ab}^{ch} \phi_{ab} \psi_a \phi_b, \qquad [74]$$

where the terms are defined analogously as with equation [73], and, for example, $M_{ab}^{ch}$ means the double-indexed message from source nodes ch to destination nodes ab. Here, the value $\phi_{ab}$, is the compatibility matrix between nodes a and b, and is a function of $S_a$ and $S_b$. FIG. 8(b) is a graphical representation of Equation [74]. An arrow dragging a line symbolizes a double-indexed message, and a simple line connecting two nodes symbolizes a compatibility matrix.

The marginal probability of a square region is expressed as:

$$P(S_a, S_b, S_f, S_e) = M_a^c M_a^d M_b^g M_b^h M_f^k M_f^l M_e^i M_e^j M_{ab}^{ch} M_{fb}^{lg} M_{ef}^{jk} M_{ea}^{id} \phi_{ab}\phi_{ae}\phi_{bf}\phi_{ef}\psi_a\psi_b\psi_f\psi_e \qquad [75]$$

with the notation defined as for the equations above. FIG. 8(c) is a graphical representation of Equation [75].

By marginalizing equation [74] over $S_b$, and setting the result equal to equation [73], we obtain one of the two sets of self-consistent message equations that are satisfied by the converged values of the messages:

$$M_a^b = M_b^f M_b^g M_b^h M_{ab}^{ef} M_{ab}^{ch} \phi_{ab} \psi_b. \qquad [76]$$

Figure 9:
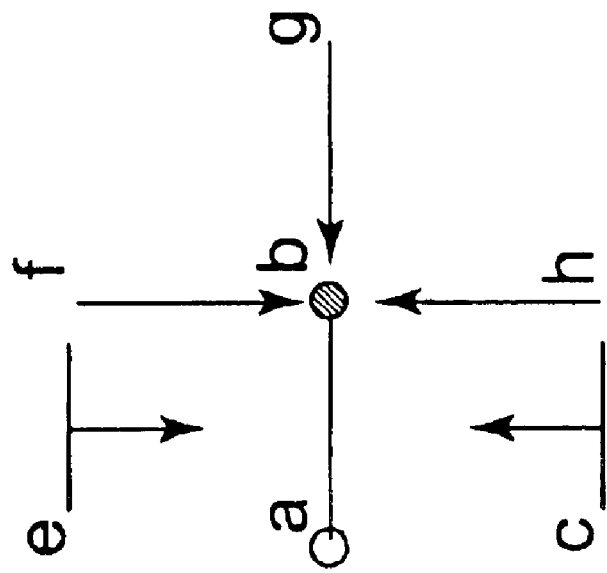
FIG. 9 is a graph of an identity for the belief propagation of FIGS. 8a–c.
Figure 9:

FIG. 9 is a graphical representation of equation [76].

By marginalizing equation [75] over $S_e$ and $S_f$, and setting the result equal to equation [74], we obtain the other set of self-consistent message equations:

$$M_{ab}^{ef} = \frac{M_f^k M_f^l M_e^i M_e^j M_{fb}^{lg} M_{ef}^{jk} M_{ea}^{id} \varphi_{ae}\varphi_{ef}\varphi_{fb}\psi_e\psi_f}{M_a^e M_b^f}. \qquad [77]$$

Figure 10:
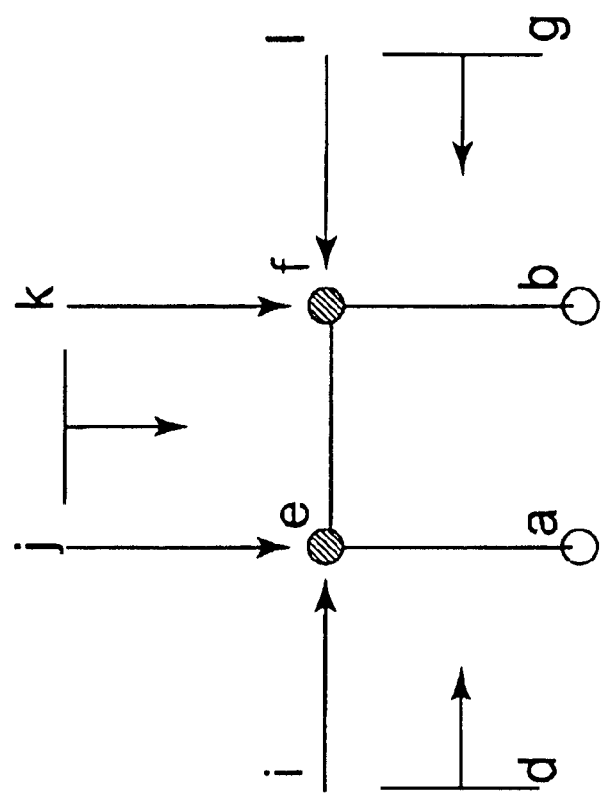
FIG. 10 is a graph of another identity of the belief propagation of FIG. 7.
Figure 10:
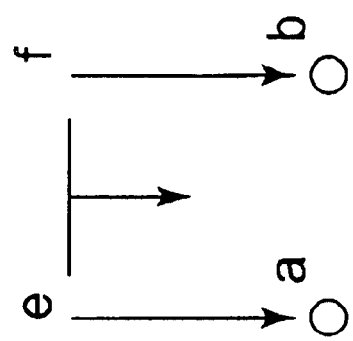

For the values of $M_a^e$ and $M_b^f$ in equation [77], we use the values determined from equation [76]. FIG. 10 is a graphical representation of equation [77].

Triangular Lattice

A triangular lattice is another Markov network of particular interest for modeling two dimensional datasets. FIG. 2(b) is an example of a triangular lattice. Analogously with the equations and notation as described above, we described the following.

The marginal probability of a single-node region is expressed as:

$$P(S_a) = M_a^b M_a^c M_a^d M_a^e M_a^i M_a^l \psi_a. \qquad [78]$$

Figure 11C:
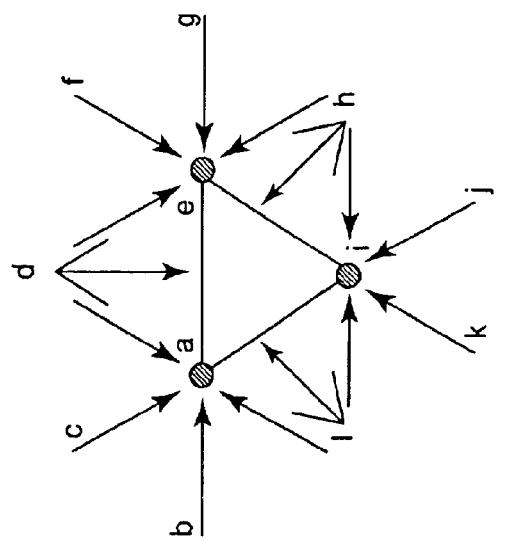
FIGS. 11a–c are graphs of belief propagation for a triangular network.
Figure 11B:
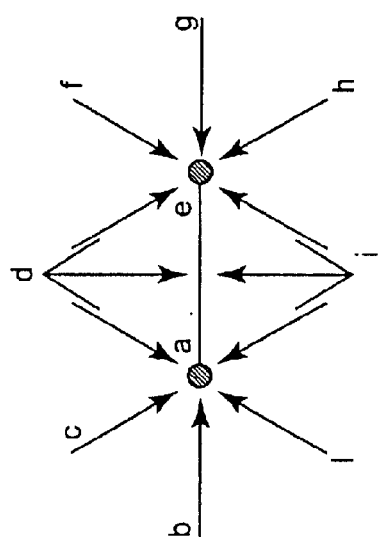
Figure 11A:
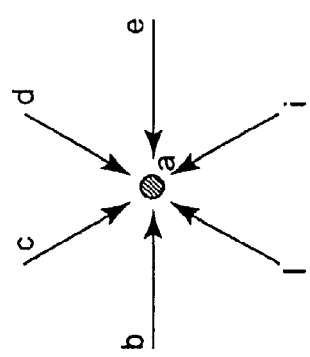

FIG. 11(a) is a graphical representation of equation [78].

The marginal probability of a region consisting of two linked nodes is expressed as:

$$P(S_a, S_e) = M_a^b M_a^c M_a^d M_a^i M_a^l M_e^d M_e^f M_e^g M_e^h M_e^i M_{ae}^d M_{ae}^i \phi_{ae}\psi_a\psi_e. \qquad [79]$$

FIG. 11(b) is a graphical representation of equation [79]. The marginal probability of a triangle region is expressed as:

$$P(S_a, S_e, S_i) = M_a^l M_a^b M_a^c M_a^d M_e^d M_e^f M_e^g M_e^h M_i^h M_i^j M_i^k M_i^l M_{ai}^l M_{ae}^d M_{ei}^h \phi_{ae}\phi_{ai}\phi_{ei}\psi_a\psi_e\psi_i. \qquad [80]$$

FIG. 11(c) is a graphical representation of equation [80].

By marginalizing equation [79] over $S_e$, and setting the result equal to [78], we obtain the self-consistent message equation:

$$M_a^e = M_e^d M_e^f M_e^g M_e^h M_e^i M_{ae}^d M_{ae}^i \phi_{ae}\psi_e \qquad [81]$$

Figure 12:
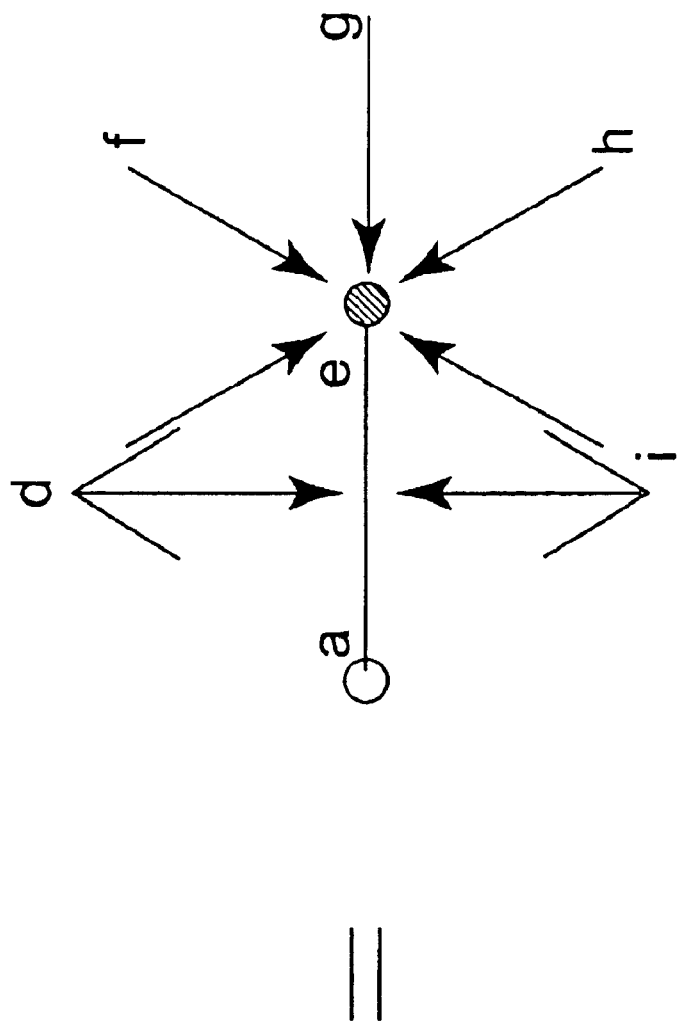
FIG. 12 is a graph of an identity for the belief propagation of FIGS. 11a–c.

FIG. 12 is a graphical representation of equation [81].

By marginalizing equation [80] over $S_i$, and setting the result equal to equation [79], we obtain the self-consistent message equation:

$$M_{ae}^i = \frac{M_k^l M_i^k M_i^j M_i^h M_{ai}^l M_{ei}^h \varphi_{ai}\varphi_{ei}\psi_i}{M_a^i M_e^i}. \qquad [82]$$

Figure 13:
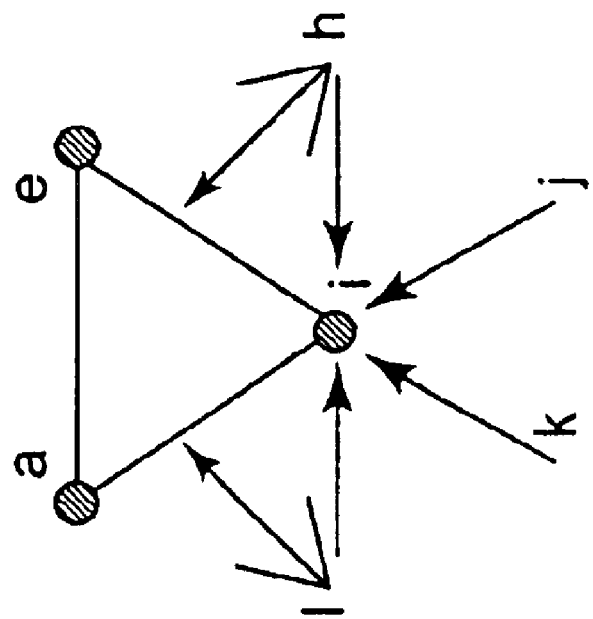
FIG. 13 is a graph of another identity for the belief propagation of FIGS. 11a–c.
Figure 13:
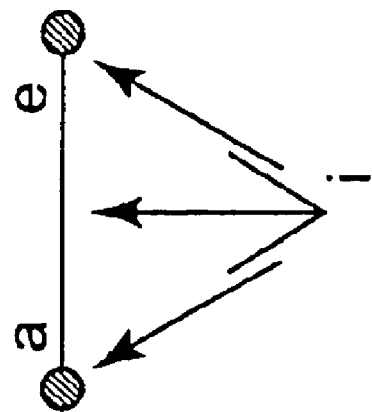

FIG. 13 is a graphical representation of equation [82]. As described above for the square lattice, for the values of $M_a^i$ and $M_e^i$ in equation [82], we use the values determined from equation [81] during the same iteration.

Modified Loopy Super-Node Method

We now describe an alternative embodiment of our invention. We call this embodiment the "modified loopy super-node method." This method is partially motivated by Pearl's "clustering method", and the related "junction tree method" which are prior-art methods that has been employed to obtain exact answers for Markov networks with only a few loops, see "Learning in Graphical Models", edited by M. I. Jordan, 1998.

In the junction tree method, one generates a Markov network equivalent to the original one by grouping the original nodes into "super-nodes." New $\phi$ compatibility matrices and $\psi$ evidence functions are also generated for the super-nodes such that the probability of any state using the super-node formulation is equivalent to its probability in the original Markov network. If the super-node Markov network has no loops, one can apply standard belief-propagation to determine exactly the desired marginal probabilities, even if the original Markov network had some loops. Using the standard belief propagation method on a super-node network that was designed to have no loops is called the "junction tree method."

Of course, if the super-node network still has loops, one is still faced with a difficult problem which standard belief propagation will not solve exactly. Nevertheless, one might consider the obvious "naïve" method of using ordinary loopy belief propagation on the super-node network. This "naïve" method, which one might call the "loopy super-node method," sometimes gives acceptable results, but empirical testing shows that it also can give very poor results for some simple networks.

In our alternative embodiment of our invention, we make a modification to the loopy super-node method which guarantees that it converges. Our modified method also gives results that are equivalent to using a Kikuchi approximation with clusters corresponding to the chosen super-nodes. Thus, our "modified loopy super-node method" is an alternative method that obtains the same results as our "canonical" method described above.

Figure 14:
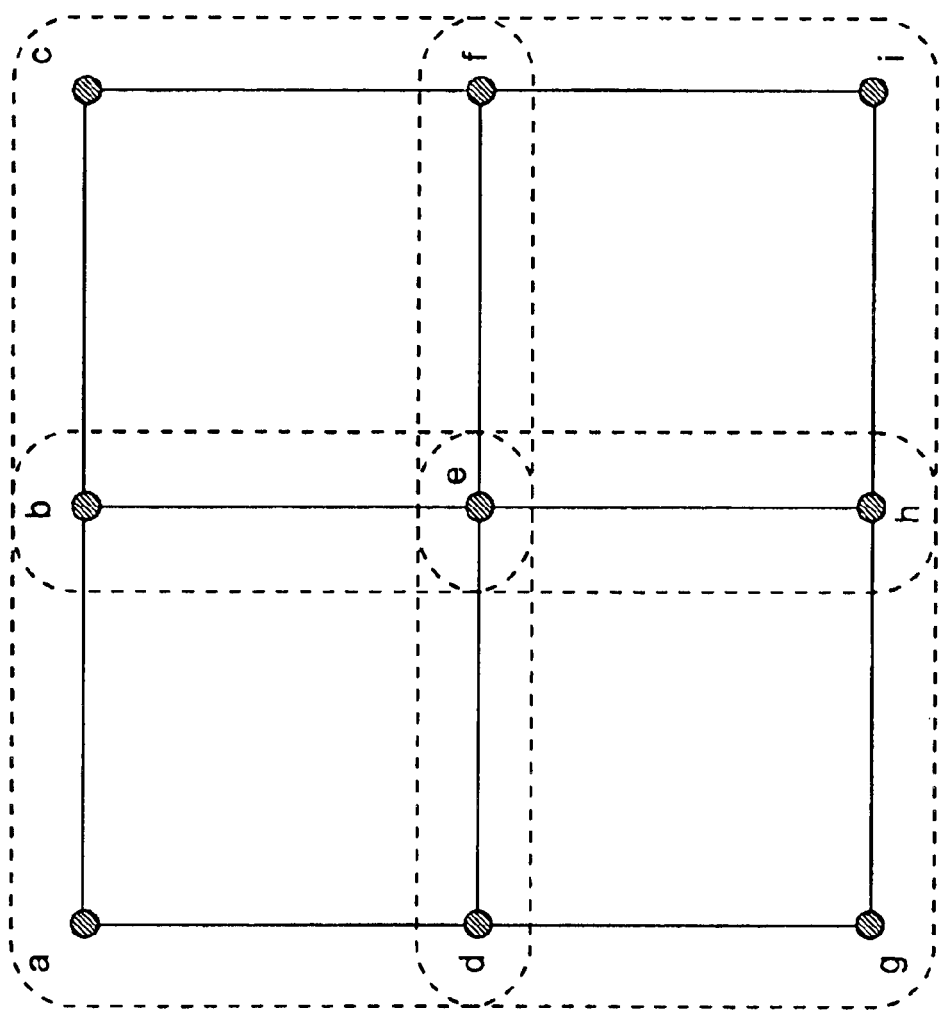
FIG. 14 is graph of a nine node network grouped into four clusters.

For concreteness, we illustrate the modified loopy super-node method using the same specific Markov network model and choice of clusters that we used to illustrate the "canonical" method, see FIG. 14. This network consists of nine nodes ($a$ through $i$), and we choose four arbitrary clusters (abde), (bcef), (degh), and (efhi). These four clusters are also referred to as "super-nodes."

Constructing A Super-Node Network

We begin by reformulating the average energy U. The Kikuchi approximation for the average energy is in fact exactly correct when we use the correct marginal probabilities. For our example network, the average energy is expressed within the Kikuchi approximation as:

$$U = \sum_{\alpha_{abde}} P(\alpha_{abde})E(\alpha_{abde}) + \sum_{\alpha_{bcef}} P(\alpha_{bcef})E(\alpha_{bcef}) + \quad [83]$$

$$\sum_{\alpha_{degh}} P(\alpha_{degh})E(\alpha_{degh}) + \sum_{\alpha_{efhi}} P(\alpha_{efhi})E(\alpha_{efhi}) -$$

$$\sum_{\alpha_{be}} P(\alpha_{be})E(\alpha_{be}) - \sum_{\alpha_{de}} P(\alpha_{de})E(\alpha_{de}) -$$

$$\sum_{\alpha_{je}} P(\alpha_{je})E(\alpha_{je}) - \sum_{\alpha_{he}} P(\alpha_{he})E(\alpha_{he}) + \sum_{\alpha_e} P(\alpha_e)E(\alpha_e).$$

This expression includes terms that sum over the intersection regions (be), (de), fe), (he), and (e). As for the canonical method above, we want to eliminate these terms and have an expression that only contains sums over the super-node regions. We can easily do that because each of the sums over the intersection regions can be expressed as a sum over a super-node region. For example, $$\sum_{\alpha_{be}} P(\alpha_{be})E(\alpha_{be}) = \sum_{\alpha_{abde}} P(\alpha_{abde})E(\alpha_{be}). \quad [84]$$

This equation is true because of the marginalization formulae for $P(\alpha_{be})$:

$$\sum_{\alpha_{abde}} P(\alpha_{abde})E(\alpha_{be}) = \sum_{\alpha_{be}}\sum_{\alpha_{ad}} P(\alpha_{abde})E(\alpha_{be}) \quad [85]$$

$$= \sum_{\alpha_{be}} E(\alpha_{be}) \sum_{\alpha_{ad}} P(\alpha_{abde}) \quad [86]$$

$$= \sum_{\alpha_{be}} E(\alpha_{be})P(\alpha_{be}). \quad [87]$$

Therefore, the Kikuchi average energy can be expressed as:

$$U = \sum_{\alpha_{abde}} P(\alpha_{abde})\tilde{E}(\alpha_{abde}) + \sum_{\alpha_{bcef}} P(\alpha_{bcef})\tilde{E}(\alpha_{bcef}) + \quad [88]$$

$$\sum_{\alpha_{degh}} P(\alpha_{degh})\tilde{E}(\alpha_{degh}) + \sum_{\alpha_{efhi}} P(\alpha_{efhi})\tilde{E}(\alpha_{efhi}).$$

The $\tilde{E}$ terms are not uniquely determined. They depend on how we choose to distribute the intersection region terms. One choice is:

$$\tilde{E}(\alpha_{abde}) = E(\alpha_{abde}) - E(\alpha_{be}) + E(\alpha_e) \quad [89]$$

$$\tilde{E}(\alpha_{bcef}) = E(\alpha_{bcef}) - E(\alpha_{ef}) \quad [90]$$

$$\tilde{E}(\alpha_{ghde}) = E(\alpha_{ghde}) - E(\alpha_{de}) \quad [91]$$

$$\tilde{E}(\alpha_{efhi}) = E(\alpha_{efhi}) - E(\alpha_{he}). \quad [92]$$

Our goal is to construct a Markov network between the super-nodes that is equivalent to the original Markov network. Let us label the four super-nodes by the numbers 1, 2, 3, and 4, see FIG. 15a. We construct the evidence functions using the equation, for super-node 1.

$$\psi_1(\alpha_1) = e^{-\tilde{E}(\alpha_1)/T}, \quad [93]$$

and similarly for the other super-nodes.

The compatibility matrices between the super-node regions are chosen so that if two super-nodes are in consistent states, then the compatibility function is one, otherwise the compatibility function is zero. For example, if super-node 1 is in a first "super-node" state such that node b is in some first "node" state, and super-node 2 is in a second "super-node" state such that node b is in a second "node" state, than the two super-nodes are in inconsistent "super-node" states. The compatibility matrix $\phi_{12}(\alpha_1, \alpha_2)$ should equal zero for those particular states.

If we define the evidence vectors and compatibility matrices as described, then the joint probability for super-node states is:

$$\tilde{P}(\alpha_1, \alpha_2, \alpha_3, \alpha_4) = \frac{1}{Z} \prod_n \tilde{\psi}_n(\alpha_n) \prod_{mn} \tilde{\phi}_{mn}(\alpha_m, \alpha_n) \quad [94]$$

(n and m are super-node indices) will exactly agree with the joint probability P defined for the original nodes.

Figure 15A:
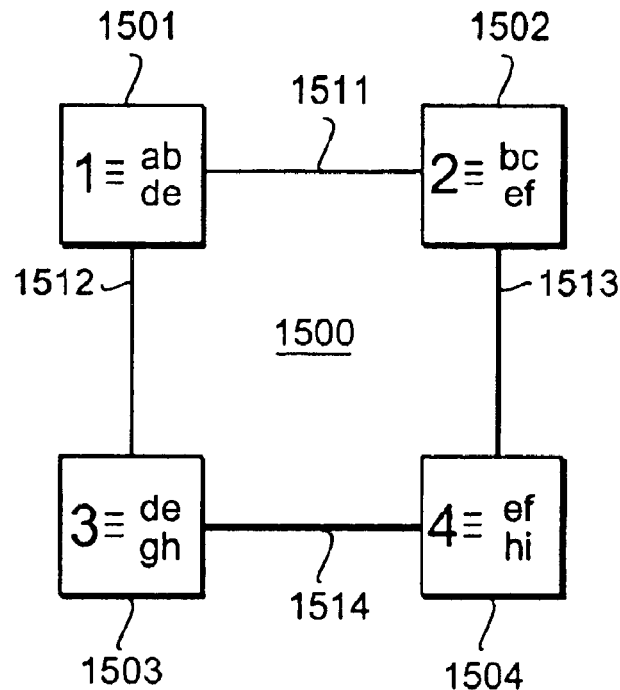
FIG. 15a is a graph of the network of FIG. 14 with the nodes grouped into four clusters.

We summarize our construction in FIG. 15a. We define a new "super-node" graph 1500 that has four super-nodes 1501–1504: 1≡(abde), 2≡(bcef), 3≡(degh), and 4≡(efhi). We denote the local "evidence potentials" for the four super-nodes by $\psi$. We set the pairwise connections (links) $\phi$ 1511–1514 between the super-nodes so that super-nodes must agree on shared nodes. By construction, the super-node network 15a has the same probability distribution as the original network of FIG. 14.

In order that our super-node network is consistent with the Kikuchi approximation to the Gibbs free energy, we also must enforce all the constraints between the regions involved in the Kikuchi approximation. We aim for a minimal set of constraints (Lagrange multipliers). Note that in the canonical method, we used an over-complete set of constraints. The following set of marginalization constraints are sufficient for our example network:

$$\sum_{\alpha_{ad}} P(\alpha_{abde}) = P(\alpha_{be}) = \sum_{\alpha_{ef}} P(\alpha_{bcef}) \quad [95]$$

$$\sum_{\alpha_{bc}} P(\alpha_{bcef}) = P(\alpha_{ef}) = \sum_{\alpha_{hi}} P(\alpha_{efhi}) \quad [96]$$

$$\sum_{\alpha_{fi}} P(\alpha_{efhi}) = P(\alpha_{eh}) = \sum_{\alpha_{dg}} P(\alpha_{degh}) \quad [97]$$

$$\sum_{\alpha_{gh}} P(\alpha_{degh}) = P(\alpha_{de}) = \sum_{\alpha_{ab}} P(\alpha_{abde}) \quad [98]$$

$$\sum_{\alpha_{be}} P(\alpha_{be}) = P(\alpha_e), \quad [99]$$

in addition to the standard normalization constraints on the super-node regions.

With these choices, the Kikuchi free energy for this example network takes the following form:

$$U = \sum_{\alpha_1} P(\alpha_1)\tilde{E}(\alpha_1) + \sum_{\alpha_2} P(\alpha_2)\tilde{E}(\alpha_2) + \sum_{\alpha_3} P(\alpha_3)\tilde{E}(\alpha_3) + \quad [100]$$

$$\sum_{\alpha_4} P(\alpha_4)\tilde{E}(\alpha_4) + T\left[\sum_{\alpha_1} P(\alpha_1)\ln P(\alpha_1) + \sum_{\alpha_2} P(\alpha_2)\ln P(\alpha_2) + \right.$$

$$\left. \sum_{\alpha_3} P(\alpha_3)\ln P(\alpha_3) + \sum_{\alpha_4} P(\alpha_4)\ln P(\alpha_4)\right] -$$

$$T\left[\sum_{\alpha_{be}} P(\alpha_{be})\ln P(\alpha_{be}) + \sum_{\alpha_{de}} P(\alpha_{de})\ln P(\alpha_{de}) + \right.$$

$$\left. \sum_{\alpha_{fe}} P(\alpha_{fe})\ln P(\alpha_{fe}) + \sum_{\alpha_{he}} P(\alpha_{he})\ln P(\alpha_{he})\right] +$$

$$T\sum_{\alpha_e} P(\alpha_e)\ln P(\alpha_e) + \gamma_1\left[1 - \sum_{\alpha_1} P(\alpha_1)\right] + \gamma_2\left[1 - \sum_{\alpha_2} P(\alpha_2)\right] +$$

$$\gamma_3\left[1 - \sum_{\alpha_3} P(\alpha_3)\right] + \gamma_4\left[1 - \sum_{\alpha_4} P(\alpha_4)\right] +$$

$$\sum_{\alpha_{be}} \lambda_{1\backslash be}(\alpha_{be})\left[P(\alpha_{be}) - \sum_{\alpha_{1\backslash be}} P(\alpha_1)\right] +$$

$$\sum_{\alpha_{be}} \lambda_{2\backslash be}(\alpha_{be})\left[P(\alpha_{be}) - \sum_{\alpha_{1\backslash be}} P(\alpha_2)\right] +$$

$$\sum_{\alpha_{de}} \lambda_{1\backslash de}(\alpha_{de})\left[P(\alpha_{de}) - \sum_{\alpha_{1\backslash de}} P(\alpha_1)\right] +$$

$$\sum_{\alpha_{de}} \lambda_{3\backslash de}(\alpha_{de})\left[P(\alpha_{de}) - \sum_{\alpha_{3\backslash de}} P(\alpha_3)\right] +$$

$$\sum_{\alpha_{fe}} \lambda_{2\backslash fe}(\alpha_{fe})\left[P(\alpha_{fe}) - \sum_{\alpha_{2\backslash fe}} P(\alpha_2)\right] +$$

-continued $$\sum_{\alpha_{fe}} \lambda_{4\backslash fe}(\alpha_{fe})\left[P(\alpha_{fe}) - \sum_{\alpha_{4\backslash fe}} P(\alpha_4)\right] +$$

$$\sum_{\alpha_{he}} \lambda_{3\backslash he}(\alpha_{he})\left[P(\alpha_{he}) - \sum_{\alpha_{3\backslash he}} P(\alpha_3)\right] +$$

$$\sum_{\alpha_{he}} \lambda_{4\backslash he}(\alpha_{he})\left[P(\alpha_{he}) - \sum_{\alpha_{4\backslash he}} P(\alpha_4)\right] +$$

$$\sum_{\alpha_e} \lambda_{be\backslash e}(\alpha_e)\left[P(\alpha_e) - \sum_{\alpha_{be\backslash e}} P(\alpha_{be})\right].$$

When we differentiate the Kikuchi free energy with respect to the super-node region probabilities, we obtain:

$$P(\alpha_1) = k_1\psi_1(\alpha_1)\lambda_{1\backslash de}(\alpha_{be})\lambda_{1\backslash de}(\alpha_{de}) \quad [101]$$

$$P(\alpha_2) = k_2\psi_2(\alpha_2)\lambda_{2\backslash be}(\alpha_{be})\lambda_{2\backslash fe}(\alpha_{fe}) \quad [102]$$

$$P(\alpha_3) = k_3\psi_3(\alpha_3)\lambda_{3\backslash de}(\alpha_{de})\lambda_{3\backslash he}(\alpha_{he}) \quad [103]$$

$$P(\alpha_4) = k_4\psi_4(\alpha_4)\lambda_{4\backslash fe}(\alpha_{fe})\lambda_{4\backslash he}(\alpha_{he}) \quad [104]$$

Note that these equations are essentially identical to those that would be obtained from the naïve loopy belief propagation method on the super-node graph. For example, using the naïve loopy belief propagation method, the marginal probability at super-node 1 would be:

$$P(\alpha_1) = k\tilde{\psi}_1(\alpha_1)M_1^2(\alpha_1)M_1^3(\alpha_1), \quad [105]$$

where $M_1^2(\alpha_1)$ is the message from source super-node 2 to destination super-node 1. At first sight, there is a difference with equation [101] because $M_1^2(\alpha_1)$ seems to depend on the state of all four nodes (abde). In fact, when we take the compatibility matrices into account, we finds that in the naïve loopy belief propagation method, the messages between super-nodes only depend on the states of the nodes that they share. Thus we can make the identifications $M_1^2(\alpha_{be}) = \lambda_{1\backslash be}(\alpha_{be})$, $M_1^3(\alpha_{de}) = \lambda_{1\backslash de}(\alpha_{de})$, $M_2^1(\alpha_{be}) = \lambda_{2\backslash be}(\alpha_{be})$, $M_2^4(\alpha_{fe}) = \lambda_{2\backslash fe}(\alpha_{fe})$, $M_3^1(\alpha_{de}) = \lambda_{3\backslash de}(\alpha_{de})$, $M_3^4(\alpha_{he}) = \lambda_{3\backslash he}(\alpha_{he})$, $M_4^2(\alpha_{fe}) = \lambda_{4\backslash fe}(\alpha_{fe})$, and $M_4^3(\alpha_{he}) = \lambda_{4\backslash he}(\alpha_{he})$.

Figure 15B:
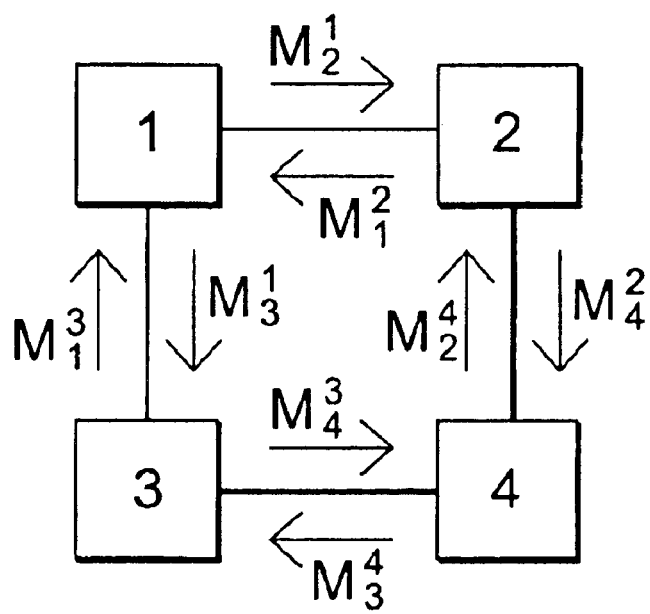
FIG. 15b is a graph of a super-node network showing standard message passing.

In FIG. 15b, we draw graphically these messages passed in the naïve loopy belief propagation method on the super-node graph.

When we substitute the region probabilities from equations [101–104] into the constraint equations [95–98], we obtain:

$$k_1 \sum_{\alpha_{1/be}} \tilde{\psi}_1(\alpha_1)\lambda_{1\backslash be}(\alpha_{be})\lambda_{1\backslash de}(\alpha_{de}) = k_2 \sum_{\alpha_{2/be}} \tilde{\psi}_2(\alpha_2)\lambda_{2\backslash be}(\alpha_{be})\lambda_{2\backslash fe}(\alpha_{fe}) \quad [106]$$

$$k_1 \sum_{\alpha_{1/de}} \tilde{\psi}_1(\alpha_1)\lambda_{1\backslash be}(\alpha_{be})\lambda_{1\backslash de}(\alpha_{de}) = k_3 \sum_{\alpha_{3/de}} \tilde{\psi}_3(\alpha_3)\lambda_{3\backslash de}(\alpha_{de})\lambda_{3\backslash he}(\alpha_{he}) \quad [107]$$

$$k_2 \sum_{\alpha_{2/fe}} \tilde{\psi}_2(\alpha_2)\lambda_{2\backslash be}(\alpha_{be})\lambda_{2\backslash fe}(\alpha_{fe}) = k_4 \sum_{\alpha_{4/fe}} \tilde{\psi}_4(\alpha_4)\lambda_{4\backslash fe}(\alpha_{fe})\lambda_{4\backslash he}(\alpha_{he}) \quad [108]$$

$$k_3 \sum_{\alpha_{3/he}} \tilde{\psi}_3(\alpha_3)\lambda_{3\backslash de}(\alpha_{de})\lambda_{3\backslash he}(\alpha_{he}) = \quad [109]$$

$$k_4 \sum_{\alpha_{4/he}} \tilde{\psi}_4(\alpha_4)\lambda_{4\backslash fe}(\alpha_{fe})\lambda_{4\backslash he}(\alpha_{he}).$$

These equations will be satisfied when we make the identification between the Lagrange multipliers $\lambda$ and the loopy belief propagation messages indicated previously, and require that the messages obey the standard propagation equations.

Take for example, equation [106]. We can simplify this as follows:

$$k_1 M_1^2(\alpha_{be}) \sum_{\alpha_{1\backslash be}} \tilde{\psi}_1(\alpha_1) M_1^3(\alpha_{de}) = k_2 M_2^1(\alpha_{be}) \sum_{\alpha_{2\backslash be}} \tilde{\psi}_2(\alpha_2) M_2^4(\alpha_{fe}). \quad [110]$$

But if we satisfy the standard belief propagation equations on the super-node graph $$M_1^2(\alpha_{be}) = k \sum_{\alpha 2\backslash be} \tilde{\psi}_2(\alpha_2) M_2^4(\alpha_{fe}) \quad [111]$$

$$M_2^1(\alpha_{be}) = k \sum_{\alpha 1\backslash be} \tilde{\psi}_1(\alpha_1) M_1^3(\alpha_{de}), \quad [112]$$

then equation [110] will be satisfied. Thus equations [106–109] are equivalent to the naïve loopy belief propagation equations for the super-node network.

However, there exist additional equations that need to be considered in the Kikuchi formalism that give rise to a modification of the naïve loopy belief propagation method. In particular, when we differentiate the Kikuchi approximation to the Gibbs free energy with respect to $P(\alpha_{de})$, $P(\alpha_{fe})$, $P(\alpha_{he})$, $P(\alpha_{be})$, and $P(\alpha_e)$, we obtain the equations:

$$P(\alpha_{de}) = k_{de} \lambda_{1\backslash de}(\alpha_{de}) \lambda_{3\backslash de}(\alpha_{de}) \quad [113]$$

$$P(\alpha_{fe}) = k_{fe} \lambda_{2\backslash fe}(\alpha_{fe}) \lambda_{4\backslash fe}(\beta_{fe}) \quad [114]$$

$$P(\alpha_{he}) = k_{he} \lambda_{3\backslash he}(\alpha_{he}) \lambda_{4\backslash he}(\alpha_{he}) \quad [115]$$

$$P(\alpha_{be}) = k_{be} \lambda_{1\backslash be}(\alpha_{be}) \lambda_{2\backslash be}(\alpha_{be}) / \lambda_{be\backslash e}(\alpha_e) \quad [116]$$

$$P(\alpha_e) = k_e / \lambda_{be\backslash e}(\alpha_e) \quad [117]$$

The first three of these equations are satisfied automatically when we identify the $\lambda$'s 1% with belief propagation messages as before. For example, for equation [113], we have:

$$P(\alpha_{de}) = \sum_{1\backslash de} P(\alpha_1) \quad [118]$$

$$= k_1 \sum_{1\backslash de} \tilde{\psi}_1(\alpha_1) M_1^2(\alpha_{be}) M_1^3(\alpha_{de})$$

$$= k_1 M_1^3(\alpha_{de}) \sum_{1\backslash de} \tilde{\psi}_1(\alpha_1) M_1^2(\alpha_{be})$$

$$= k_1 M_1^3(\alpha_{de}) M_3^1(\alpha_{de}) = k_1 \lambda_{1\backslash de}(\alpha_{de}) \lambda_{3\backslash de}(\alpha_{de})$$

However, equations [116–117] are not necessarily satisfied when we take the $\lambda$'s to have the same values as the belief propagation messages. There is another condition, which can be obtained from the constraint equation $$P(\alpha_e) = \sum_{\alpha_b} P(\alpha_{be}).$$

Using this equation, we find:

$$\sum_{\alpha_b} \lambda_{1\backslash be}(\alpha_{be}) \lambda_{2\backslash be}(\alpha_{be}) = k, \quad [119]$$

where k is some constant. As usual, the actual value of the constant is not important; what is important in this case is the fact that this sum should not depend on the state of node e. We can guarantee that all the derivative equations [106–109] and [113–119] are satisfied if we identify the $\lambda$'s with loopy belief propagation messages, but make sure that they satisfy the additional constraint of equation [119].

Figure 15C:
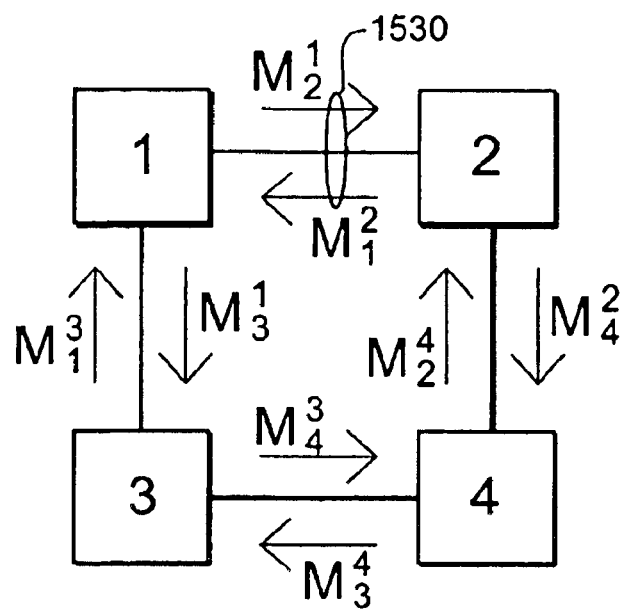
FIG. 15c is a graph showing standard and normalized message passing.
Figure 15D:
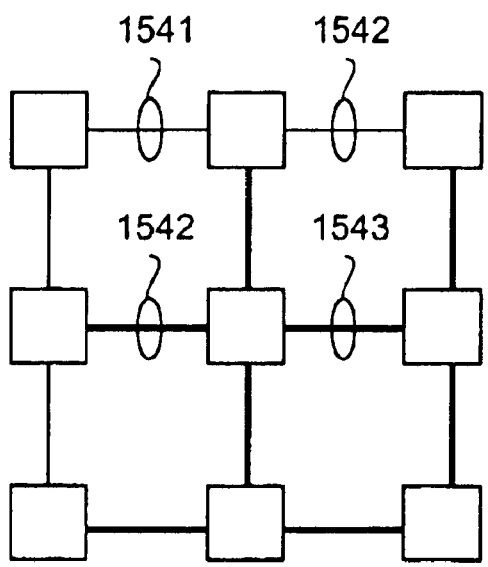
FIG. 15d is a graph of a network with nine super-nodes.

We now define a "normalization" operator. In FIGS. 15c and 15d, the normalization operator is indicated by ellipses 1530, 1541–1544. The normalization operator takes as input the messages $M_1^2(\alpha_{be})$ and $M_2^1(\alpha_{be})$ and returns as output normalized messages $\text{Norm}(M_1^2(\alpha_{be}))$ and $\text{Norm}(M_2^1(\alpha_{be}))$ defined by:

$$\text{Norm}(M_1^2(\alpha_{be})) = \frac{M_1^2(\alpha_{be})}{\sqrt{\sum_{\alpha_b} M_1^2(\alpha_{be}) M_2^1(\alpha_{be})}} \quad [120]$$

$$\text{Norm}(M_2^1(\alpha_{be})) = \frac{M_2^1(\alpha_{be})}{\sqrt{\sum_{\alpha_b} M_1^2(\alpha_{be}) M_2^1(\alpha_{be})}}. \quad [121]$$

By construction:

$$\sum_{\alpha_b} \text{Norm}(M_1^2(\alpha_{be})) \text{Norm}(M_2^1(\alpha_{be})) = 1, \quad [122]$$

so if we identify the $\lambda$'s with normalized belief propagation messages, equation [119] will be satisfied. The normalization constraint [119] can be satisfied simultaneously with the ordinary belief propagation constraints implicit in equations [106–109], if we follow the modified loopy junction tree method (see FIG. 15c). For this example network, that means that we iteratively solve the belief-propagation equations for the super-node lattice, taking care at every iteration to apply the normalization operator to messages $M_1^2(\alpha_{be})$ and $M_2^1(\alpha_{be})$.

Applying this method to our example network yields results identical to those obtained from the canonical method, as expected. The results are significantly more accurate than those obtained from the "naïve" loopy super-node method.

The Modified Loopy Super-Node Method for a General Markov Network

Figure 16:
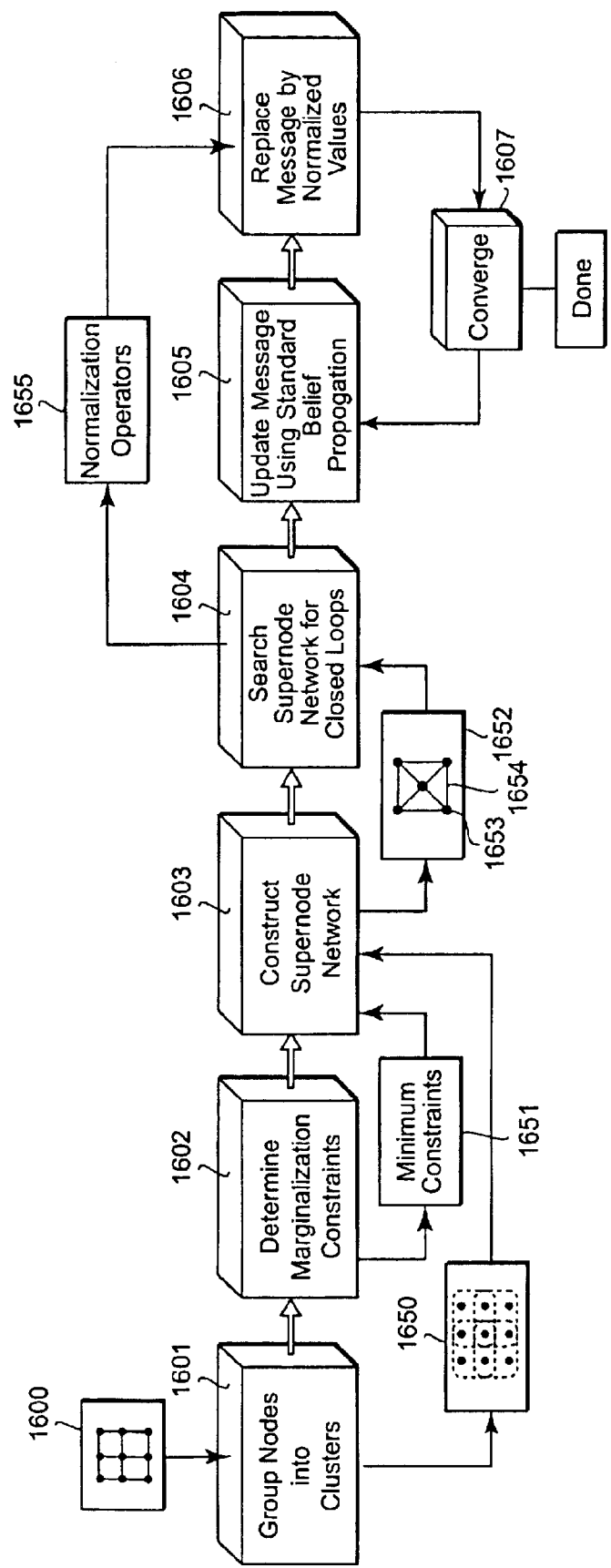
FIG. 16 is a flow diagram of an alternative embodiment of the belief propagation method according to the invention.

We have described the modified loopy super-node method for our example network. We now describe how to use this method for an arbitrary network with arbitrary groupings of nodes into super-nodes. A general version of the method includes the following steps as shown in FIG. 16.

In step 1601, group all of the nodes of the network 1600 into a set of intersecting clusters 1650. As stated above, the grouping can be heterogeneous and arbitrary. As an advantage of the arbitrary clustering according to the invention, the user can trade accuracy for computational complexity. Larger clusters give better results, but take more time to resolve. Groups of nodes that are less relevant can be grouped into smaller clusters.

In step 1602, determine a minimal number of marginalization constraints 1651 that need to be satisfied between the clusters 1650.

In step 1603, construct a super-node network 1652. In the network 1652, each cluster of nodes is represented by just one super-node 1653. Super-nodes that share one of the marginalization constraints determined in step 1602 are connected by a super-link 1654.

In step 1604, the super-node network 1652 is searched to locate closed loops of super-nodes that contain at least one common node. For each such closed loop, determine a normalization operator 1655.

In step 1605, update the messages between super-nodes using standard belief propagation.

In step 1606, replace the messages by their normalized values using the corresponding normalization operator, and repeat step 1605 until convergence in step 1607.

If we have a fixed point of the modified loopy super-node method, then it is equivalent to the result obtained from minimizing the Kikuchi free energy.

Application to Decoding Error-Correcting Codes

An "error-correcting" code is an encoding of digital, e.g., binary, messages. The code adds redundancy that is designed to protect the transmission of the messages from corruption by noise. Typically, the sender of a message transmits "blocks" of bits (binary digits), where each block contains the "data bits" of the original message, plus some additional "check bits" which help to decode the message if it arrives at a receiver in a corrupted form. For example, a check bit may encode the parity of the sum of selected data bits.

Markov networks have been widely used to represent error-correcting codes, see "Good Error-Correcting Codes based on Very Sparse Matrices", by D. MacKay, IEEE Transactions on Information Theory, March, 1999. In the Markov network formulation of an error-correcting code, some of the nodes of the Markov network will correspond to the data bits and the check bits, and the links between the nodes will enforce the appropriate relationships between data bits and check bits.

The standard decoding algorithm used for some error-correcting codes is the loopy belief propagation method, using either marginal or MAP probabilities, run on the Markov network that corresponds to the error-correcting code, see R. McEliece, D. MacKay, and J. Cheng, IEEE J. Selected Areas in Communication, 1997. When the MAP version of belief propagation is used, the decoded states of the bits are just the MAP states of the corresponding nodes. When the marginal probability version of belief propagation is used, the decoded states of the bits are taken to be those states of the corresponding nodes that have the highest marginal probability.

In decoding according to our invention, the loopy belief propagation method is replaced by the method according to the invention. Our method provides improved decoding for error-correcting codes.

Other Applications

The belief propagation method as described herein can be used in a number of applications. It can be used in computer vision problems where scenes need to be estimated, see U.S. patent application Ser. No. 09/203,108, "Estimating Scenes Using Statistical Properties of Images and Scenes," filed by Freeman et al. on Nov. 30, 1998, also see U.S. patent application Ser. No. 09/236,839, "Estimating Targets Using Statistical Properties of Observations of Known Targets," filed by Freeman et al. on Jan. 25, 1999. It can also be used in object recognition systems such as the air-to-ground targeting system described in U.S. Pat. No. 5,963,653, "Hierarchical information fusion object recognition system and method," issued to McNary et al. on Oct. 5, 1999. A number of other applications that are well suited for the invention are mentioned in U.S. Pat. No. 5,802,256, "Generating improved belief networks," issued to Heckerman, et al. on Sep. 1, 1998, for example, crop production estimation, program debugging, coastal ocean environments prediction, diagnosing linear lightwave networks. Speech recognition applications that can use the present invention are described in U.S. Pat. No. 5,623,609, "Computer system and computer-implemented process for phonology-based automatic speech recognition," issued to Kaye et al. on Apr. 22, 1997.

In this description of the invention, we used specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for determining probabilities of states of a system represented by a model including a plurality of nodes connected by links, each node representing possible states of a corresponding part of the system, and each link representing statistical dependencies between possible states of related nodes, comprising:

grouping the plurality of nodes into arbitrary-sized clusters such that every node is included in at least one cluster and each link is completely contained in at least one cluster;

identifying nodes in intersections of clusters, and intersections of intersections of clusters as regions of nodes;

defining messages based on the regions of nodes, each message having associated sets of source nodes and destination nodes and a value and a rule depending on other messages and selected links connecting the source nodes and destination nodes;

assigning initial values to the messages;

updating the value of each message using the associated rule; and determining approximate probabilities of the states of the system from the messages when a termination condition is reached.

2. The method of claim 1 wherein the network has pair-wise statistical dependencies between nodes, and the overall probability of a particular assignment of states s at the nodes is:

$$P(s_1, s_2, \ldots s_N) = \frac{1}{Z} \prod_{i,j} \phi_{ij}(s_i, s_j) \prod_i \psi(s_i),$$

where the first product runs over all linked neighboring nodes, i and j, and wherein a $\phi$ compatibility matrix represents the statistical dependencies between the possible states s of the related nodes, and the $\psi$ function for each node represents evidence that a particular node is in a particular state, and Z is a normalization constant to insure that the sum of the probabilities of all possible states of the system is equal to one.

3. The method of claim 1 wherein the initial values of the messages are random positive numbers.

4. The method of claim 1 wherein the initial values of the messages are all ones.

5. The method of claim 1 wherein the termination condition is a convergence of the probabilities of the states of the system to a predetermined precision.

6. The method of claim 1 wherein the approximate probabilities are marginal probabilities.

7. The method of claim 1 wherein the approximate probabilities are maximum a posteriori probabilities.

8. The method of claim 1 wherein the states are discrete.

9. The method of claim 1 wherein the states are continuous.

10. The method of claim 1 wherein the network model includes closed loops.

11. The method of claim 1 wherein the nodes are arranged in a square lattice.

12. The method of claim 1 wherein the nodes are arranged in a triangular lattice.

13. The method of claim 1 wherein the nodes and links are a Markov network representation of an error-correcting code.

14. A computer implemented method for determining probabilities of states of a system represented by a model including a plurality of nodes connected by links, each node representing possible states of a corresponding part of the system, and each link representing statistical dependencies between possible states of neighboring nodes, comprising:

grouping the plurality of nodes into arbitrary-sized clusters such that every node is included in at least one cluster, and each link is completely contained in at least one cluster;

identifying nodes in intersecting clusters, and intersections of intersecting clusters as regions, and intersections of regions as sub-regions;

discarding duplicate regions and sub-regions;

arranging the regions and sub-regions in a top-to-bottom hierarchy of intersections;

defining messages between regions and direct sub-regions directly connected in the hierarchy, each message having associated sets of source nodes and destination nodes and a value and a rule depending on other messages and selected links connecting the source nodes and destination nodes, the destination nodes being those nodes in the sub-region, and the source nodes being those nodes in the region and outside the sub-region;

assigning initial values to the messages;

updating the value of each message using the associated rule until a termination condition is reached;

determining approximate probabilities of the states of the system from the messages when a termination condition is reached.

* * * * *